United States Patent
Noda

(10) Patent No.: US 9,606,338 B2
(45) Date of Patent: Mar. 28, 2017

(54) ZOOM LENS AND IMAGING APPARATUS

(71) Applicant: FUJIFILM Corporation, Tokyo (JP)

(72) Inventor: Taiga Noda, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 64 days.

(21) Appl. No.: 14/644,669

(22) Filed: Mar. 11, 2015

(65) Prior Publication Data
US 2015/0185451 A1 Jul. 2, 2015

Related U.S. Application Data

(63) Continuation of application No. PCT/JP2013/005291, filed on Sep. 6, 2013.

(30) Foreign Application Priority Data

Sep. 13, 2012 (JP) ................. 2012-201114

(51) Int. Cl.
*G02B 15/177* (2006.01)
*G02B 13/00* (2006.01)
*G02B 9/12* (2006.01)

(52) U.S. Cl.
CPC .......... *G02B 15/177* (2013.01); *G02B 13/002* (2013.01); *G02B 13/009* (2013.01); *G02B 9/12* (2013.01); *G02B 13/0035* (2013.01)

(58) Field of Classification Search
CPC ...... G02B 13/004; G02B 15/177; G02B 9/58; G02B 15/20; G02B 15/14; G02B 13/02;

(Continued)

(56) References Cited

U.S. PATENT DOCUMENTS

2008/0304163 A1  12/2008 Katakura
2009/0284642 A1  11/2009 Ichikawa
(Continued)

FOREIGN PATENT DOCUMENTS

JP  2008-292911  12/2008
JP  2009-276622  11/2009
(Continued)

OTHER PUBLICATIONS

JP2011248269 A, Kurioka Yoshiaki, Dec. 8, 2011, English Machine Translation.*
International Search Report, PCT/JP2013/005291, Jan. 14, 2014.

*Primary Examiner* — Pascal M Bui-Pho
*Assistant Examiner* — Alberto Betancourt
(74) *Attorney, Agent, or Firm* — Young & Thompson

(57) ABSTRACT

A zoom lens consists of a negative first lens group, a positive second lens group, and a positive third lens group. Upon zooming from the wide angle end to the telephoto end, the first, second, and third lens groups are moved such that distance between the first lens group and the second lens group is reduced, and distance between the second lens group and the third lens group is increased. The first lens group is composed of a negative lens and a positive lens from the object side. The zoom lens satisfies given conditional expressions related to radius of curvature, center thickness, refractive index, and Abbe number of the negative lens and refractive index of the positive lens of the first lens group, and distance from the most object side surface to the most image side surface of the first lens group on the optical axis.

11 Claims, 13 Drawing Sheets

(58) Field of Classification Search
CPC .......... G02B 9/00; G02B 13/006; G02B 9/12;
G02B 13/009; G02B 13/0035
USPC ............... 359/689, 735, 745, 748, 754, 797,
359/680–682, 694, 695
See application file for complete search history.

(56) References Cited

U.S. PATENT DOCUMENTS

| | | |
|---|---|---|
| 2010/0091381 A1 | 4/2010 | Katakura |
| 2010/0254023 A1 | 10/2010 | Ito |
| 2011/0026131 A1 | 2/2011 | Ito |
| 2012/0026601 A1 | 2/2012 | Matsumura |

FOREIGN PATENT DOCUMENTS

| | | | |
|---|---|---|---|
| JP | 2010-091948 | | 4/2010 |
| JP | 2010-134373 | | 6/2010 |
| JP | 2010-243637 | | 10/2010 |
| JP | 2011-033770 | | 2/2011 |
| JP | 2011-248269 | | 12/2011 |
| JP | 2011248269 A | * | 12/2011 |
| JP | 2012048200 | | 3/2012 |

* cited by examiner

FIG.2 EXAMPLE 2

FIG.7
EXAMPLE 1
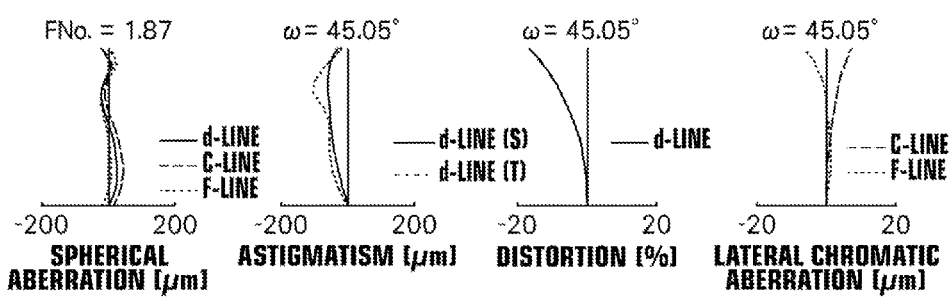
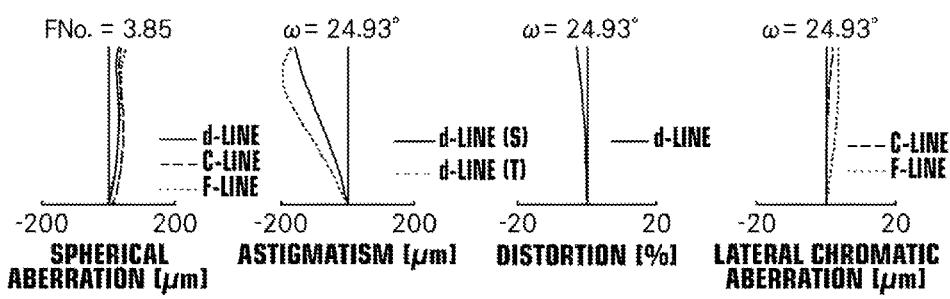
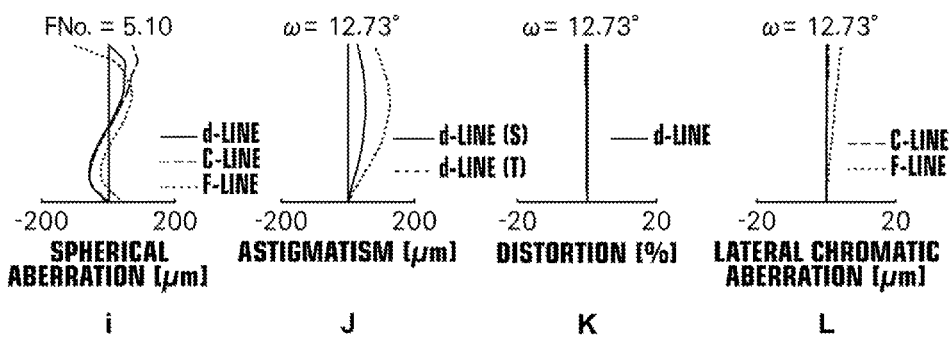

FIG.8
EXAMPLE 2
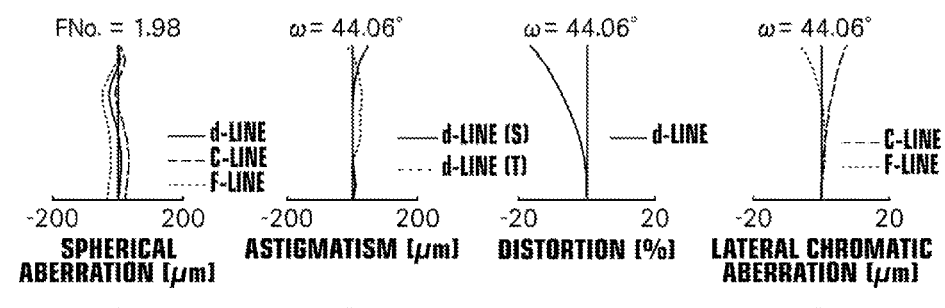
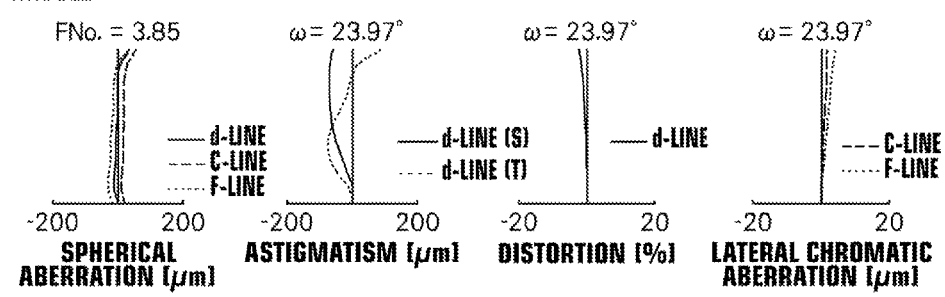
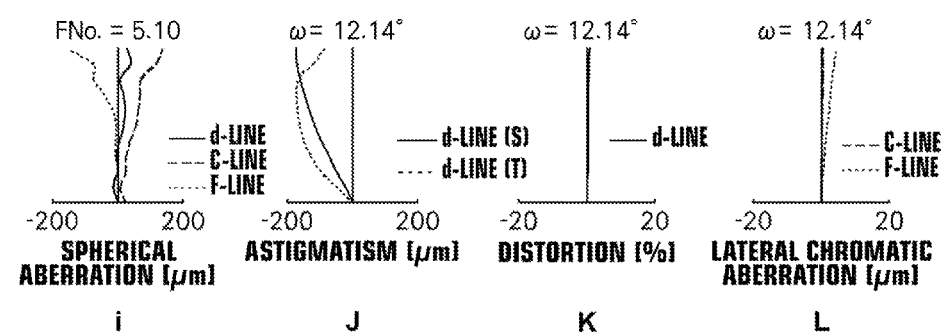

FIG.9
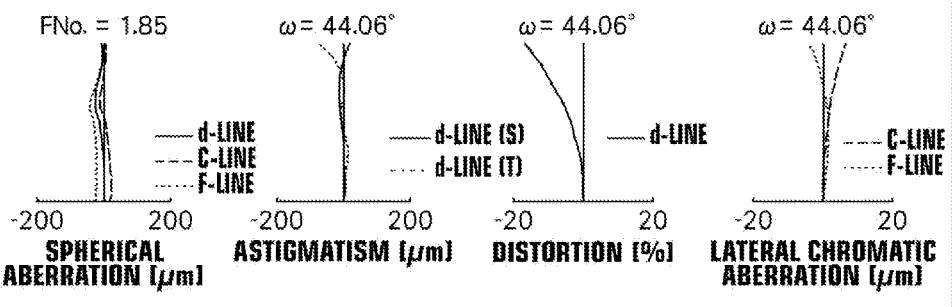
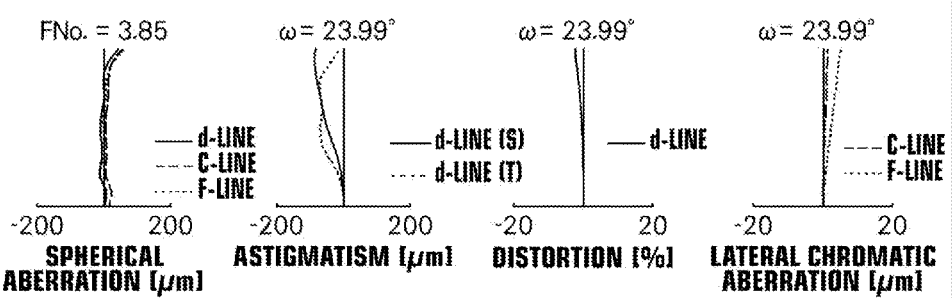
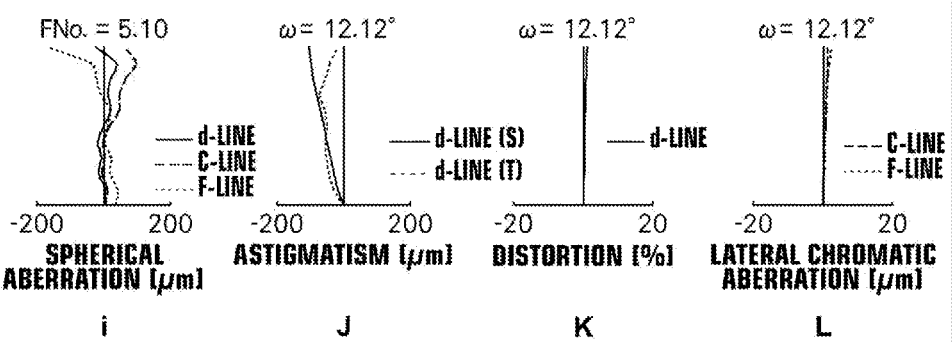

FIG.10
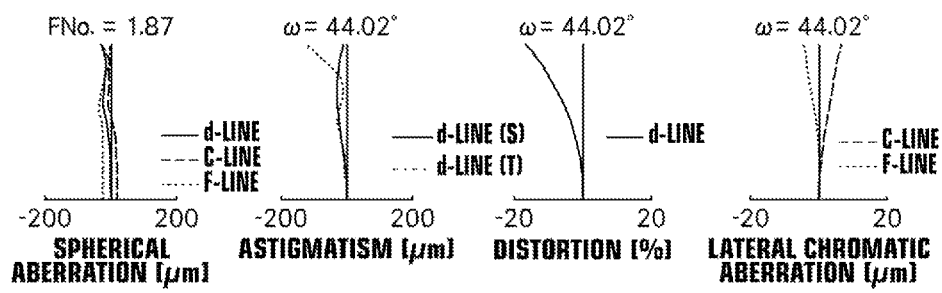
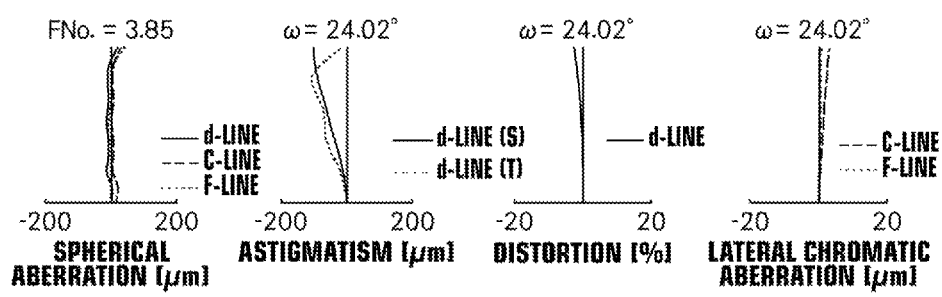
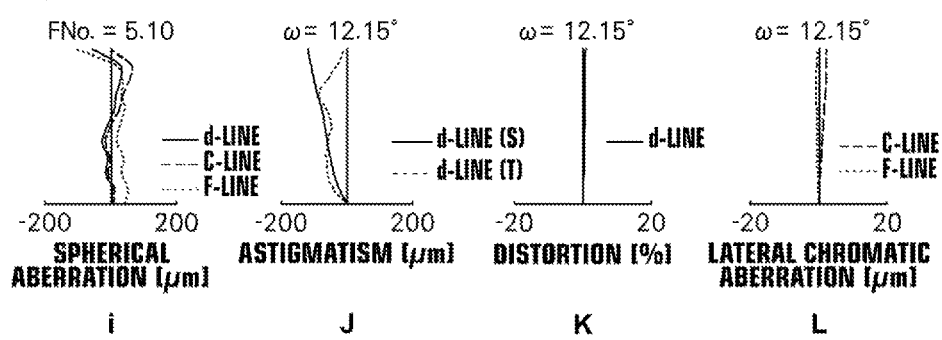

FIG.11
EXAMPLE 5
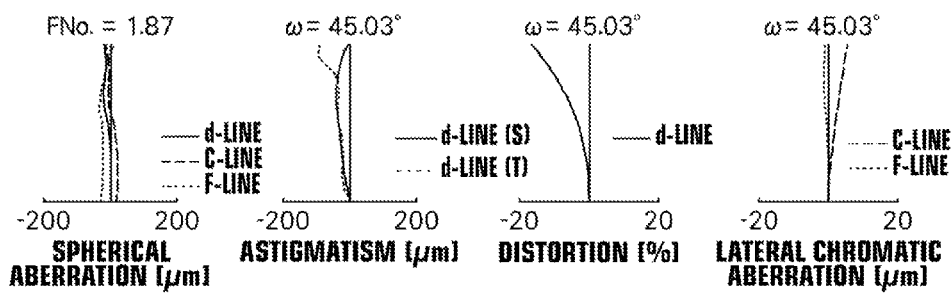
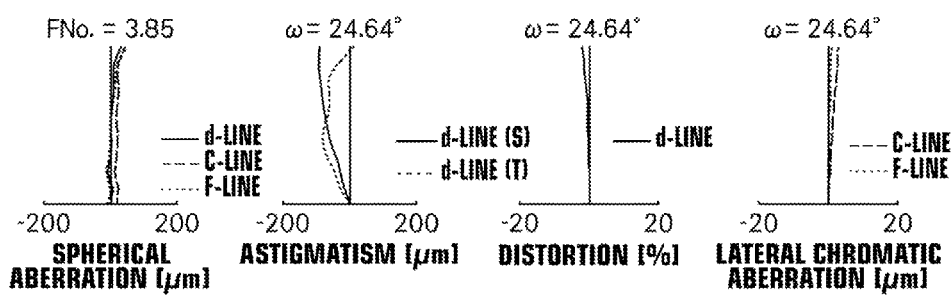
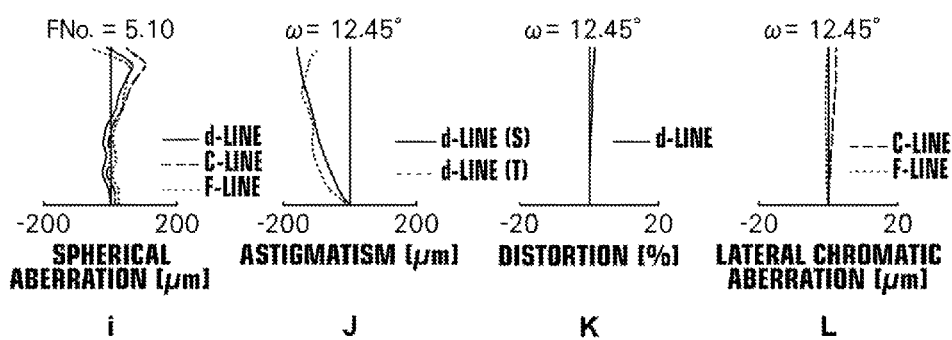

FIG.12
EXAMPLE 6
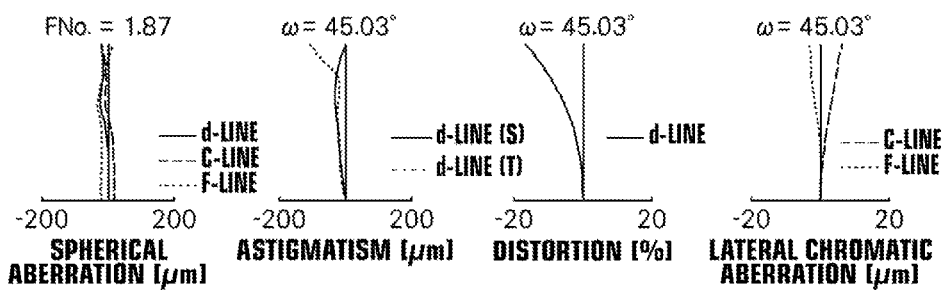
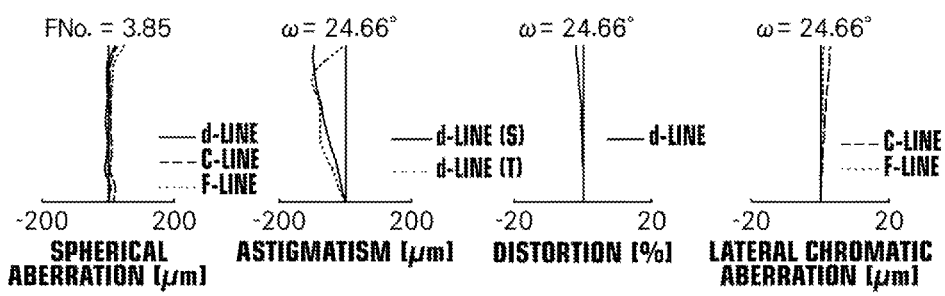
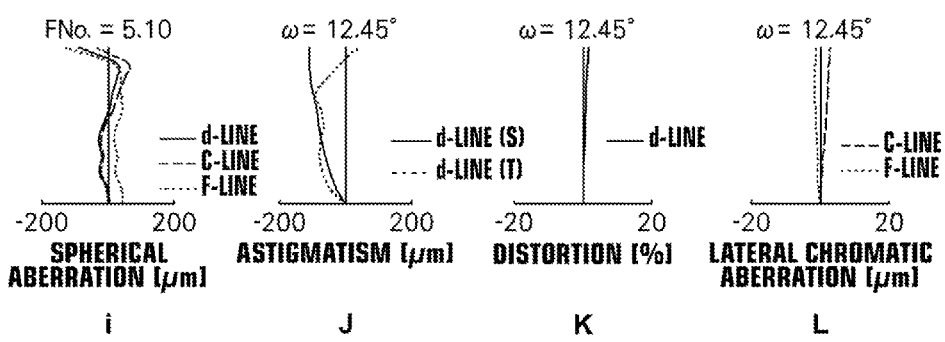

ZOOM LENS AND IMAGING APPARATUS

CROSS-REFERENCE TO RELATED APPLICATIONS

This application is a Continuation of PCT International Application No. PCT/JP2013/005291 filed on Sep. 6, 2013, which claims priority under 35 U.S.C. §119 (a) to Japanese Patent Application No. 2012-201114 filed on Sep. 13, 2012. Each of the above applications is hereby expressly incorporated by reference, in its entirety, into the present application.

BACKGROUND OF THE INVENTION

Technical Field

The present invention relates to a zoom lens and an imaging apparatus, and more specifically to a zoom lens that can be used for electronic cameras, such as digital cameras, video cameras, broadcasting cameras, surveillance cameras, and the like, and an imaging apparatus equipped with the zoom lens.

Background Art

Heretofore, as a simple zoom lens arrangement, a three-group zoom lens has been known, in which a first lens group having a negative refractive power, a second lens group having a positive refractive power, and a third lens group having a positive refractive power are disposed in order from the object side. Recently, a demand for wide angle configurations has also started to exist in the three-group zoom lens, and lens systems in the three-group zoom lens having a half angle of view of 38° or more at the wide angle end include those as described, for example, in Japanese Unexamined Patent Publication No. 2009-276622, Japanese Unexamined Patent Publication No. 2010-091948, Japanese Unexamined Patent Publication No. 2011-033770, and Japanese Unexamined Patent Publication No. 2010-243637.

SUMMARY OF INVENTION

Recently, optical systems having small F-numbers have been demanded also in the three-group zoom lens, but the lens systems described in Japanese Unexamined Patent Publication No. 2009-276622, Japanese Unexamined Patent Publication No. 2010-091948, and Japanese Unexamined Patent Publication No. 2011-033770 cannot be said to have a sufficiently small F-number to respond to the recent demand. In the meantime, along with the recent trend toward high image quality of digital cameras, cameras with larger image sensors have been demanded. The image size of the example described in Japanese Unexamined Patent Publication No. 2010-243637 corresponds to an image sensor of about 9.3 mm in diagonal, but if the optical system is tried to adapt to an image sensor having a diagonal size of 11 mm, i.e., a so-called "2/3 image sensor", the entire system needs to be proportionally increased, thereby posing a problem that the overall length of the lens system is increased too long and compactness is impaired.

The present invention has been developed in view of the circumstances described above, and it is an object of the present invention to provide a zoom lens having a small F-number and can be formed compact, while maintaining a wide angle and favorable optical performance, and an imaging apparatus equipped with such a zoom lens.

A zoom lens of the present invention consists essentially of a first lens group having a negative refractive power, a second lens group having a positive refractive power, and a third lens group having a positive refractive power, in order from the object side, in which, upon zooming from the wide angle end to the telephoto end, the first lens group, the second lens group, and the third lens group are moved along the optical axis such that the distance between the first lens group and the second lens group is reduced, and the distance between the second lens group and the third lens group is increased, the first lens group is composed essentially of a negative lens and a positive lens in order from the object side, and the zoom lens satisfies conditional expressions (1) to (5) given below:

$$0.50 < (r1+r2)/(r1-r2) < 1.00 \quad (1)$$

$$0.06 < d1/DG1 < 0.11 \quad (2)$$

$$1.94 < nd2 \quad (3)$$

$$1.80 < nd1 \quad (4)$$

$$40.0 < vd1 \quad (5)$$

where r1: radius of curvature of the object side surface of the negative lens in the first lens group, r2: radius of curvature of the image side surface of the negative lens in the first lens group, d1: center thickness of the negative lens in the first lens group, DG1: distance from the most object side surface in the first lens group to the most image side surface in the first lens group on the optical axis, nd2: refractive index of the positive lens in the first lens group with respect to the d-line, nd1: refractive index of the negative lens in the first lens group with respect to the d-line, and vd1: Abbe number of the negative lens in the first lens group with respect to the d-line.

The zoom lens of the present invention preferably satisfies a conditional expression (6) given below:

$$2.40 < f1/fw < -1.70 \quad (6)$$

where f1: focal length of the first lens group, and fw: focal length of the entire system at the wide angle end.

The zoom lens of the present invention preferably satisfies each of conditional expressions (1') to (6') given below, instead of each of the conditional expressions (1) to (6) described above. A preferred embodiment may be an embodiment that satisfies any one of the conditional expressions (1') to (6') or an embodiment that satisfies any combination thereof.

$$0.60 < (r1+r2)/(r1-r2) < 0.90 \quad (1')$$

$$0.07 < d1/DG1 < 0.10 \quad (2')$$

$$1.98 < nd2 \quad (3')$$

$$1.81 < nd1 \quad (4')$$

$$42.0 < vd1 \quad (5')$$

$$-2.20 < f1/fw < -1.90 \quad (6')$$

In the zoom lens of the present invention, at least one surface of the positive lens in the first lens group is aspherical. Further, in the zoom lens of the present invention, at least one surface of the negative lens in the first lens group is aspherical.

Preferably, the second lens group of the zoom lens of the present invention is composed essentially of a positive lens, a positive lens, a negative lens, and a positive lens in order from the object side.

Preferably, the zoom lens of the present invention is configured to perform focusing by moving only the third lens group in an optical axis direction.

An imaging apparatus of the present invention is equipped with the foregoing zoom lens of the present invention.

The foregoing each "lens group" is not necessarily formed of a plurality of lenses and includes a lens group formed of only one lens.

The foregoing "essentially" in the context of "consists essentially of" intends that the zoom lens may include, a lens having essentially no refractive power, an optical element other than a lens, such as a stop, a cover glass, a filter, and the like, a lens flange, a lens barrel, an image sensor, and a mechanical component, such as a camera shake correction mechanism, in addition to the constituent elements described above. The same applies to "essentially" in the context of "composed essentially of" described above.

The signs of the foregoing refractive powers are considered in the paraxial region for those having an aspherical surface.

The sign of a radius of curvature of a lens surface is positive if the surface shape is convex on the object side and negative if it is convex on the image side.

According to the present invention, in a three-group zoom lens arrangement of negative, positive, and positive in order from the object side, the first lens group is composed of two lenses of a negative lens and a positive lens disposed in order from the object side, and the zoom lens is configured to satisfy detailed conditional expressions related to the first lens group. This allows a zoom lens having a small F-number and can be formed compact, while maintain a wide angle and favorable optical performance, and an imaging apparatus equipped with such a zoom lens may be provided.

A to L of FIG. 7 illustrate each aberration diagram of the zoom lens of Example 1.

A to L of FIG. 8 illustrate each aberration diagram of the zoom lens of Example 2.

A to L of FIG. 9 illustrate each aberration diagram of the zoom lens of Example 3.

A to L of FIG. 10 illustrate each aberration diagram of the zoom lens of Example 4.

A to L of FIG. 11 illustrate each aberration diagram of the zoom lens of Example 5.

A to L of FIG. 12 illustrate each aberration diagram of the zoom lens of Example 6.

Figure 13A:
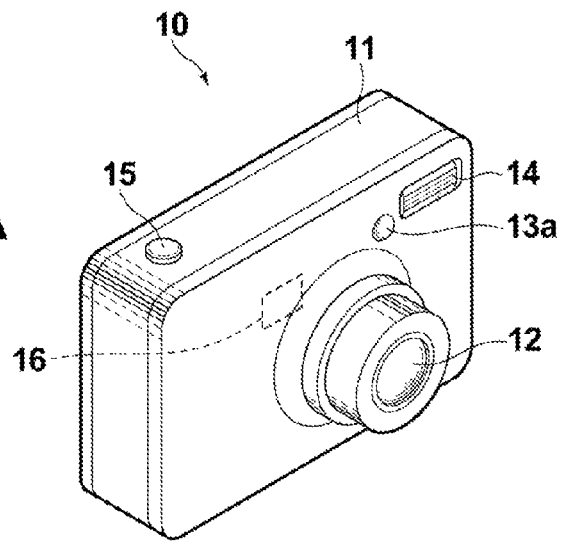

FIG. 13A is a front perspective view of an imaging apparatus according to an embodiment of the present invention.

Figure 13B:
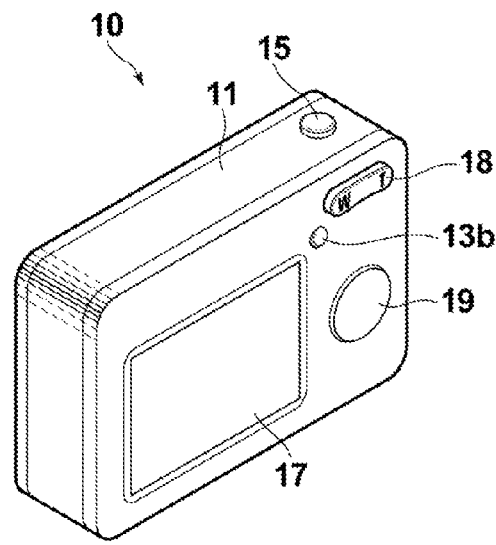

FIG. 13B is a rear perspective view of the imaging apparatus according to an embodiment of the present invention.

DESCRIPTION OF EMBODIMENTS

Hereinafter, embodiments of the present invention will be described in detail with reference to the accompanying drawings. FIGS. 1 to 6 are cross-sectional views of zoom lenses according to embodiments of the present invention, illustrating the configurations thereof, each corresponding to each of Examples 1 to 6, to be described later. In FIGS. 1 to 6, the left side is the object side and the right side is the image side, and FIGS. 1 to 6 illustrate zoom lenses in a state in which an object at infinity is in focus. As the basic configurations and illustration methods of the examples shown in FIGS. 1 to 6 are identical, a description will be made hereinafter with reference mainly to the configuration example shown in FIG. 1, as a representative.

Figure 1:
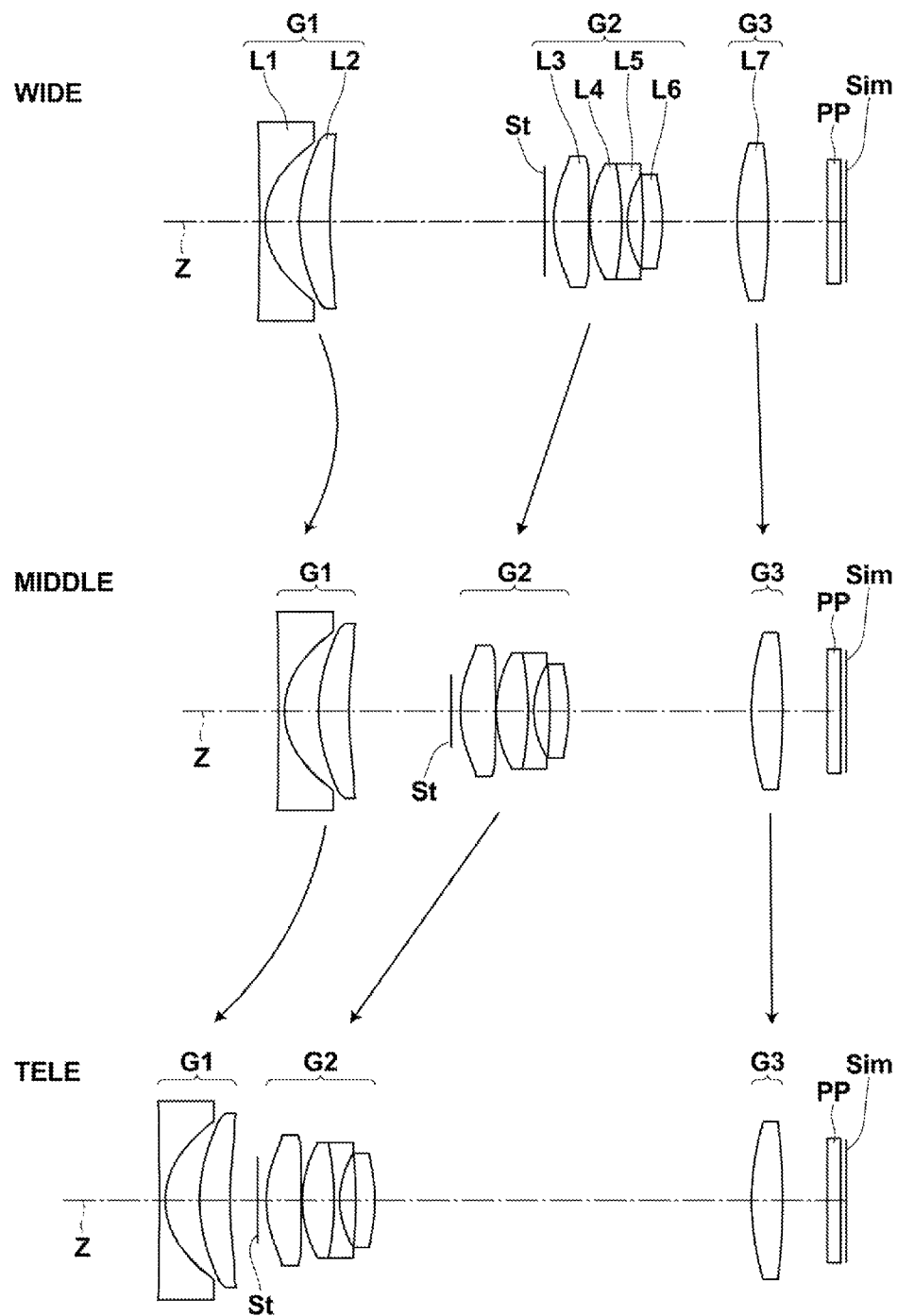
FIG. 1 is a cross-sectional view of a zoom lens of Example 1 of the present invention, illustrating the lens configuration thereof.

In FIG. 1, the disposition and the configuration of each lens group at the wide angle end, in an intermediate focal length state, and at the telephoto end are illustrated on the upper side, middle, and lower side having symbols [WIDE], [MIDDLE], and [TELE] attached thereto on the left respectively. Further, in FIG. 1, the movement trajectories of the respective lens groups upon zooming from the wide angle end to the intermediate focal length state are schematically illustrated by the arrows between the upper side and the middle, and the movement trajectories of the respective lens groups upon zooming from the intermediate focal length state to the telephoto end are schematically illustrated by the arrows between the middle to the lower side. As the movement trajectories in the examples shown in FIGS. 2 to 6 are nearly identical, and the arrows indicating the movement trajectories are omitted in FIGS. 2 to 6.

The zoom lens of the present embodiment consists essentially of three lens groups composed of a first lens group G1 having a negative refractive power, a second lens group G2 having a positive refractive power, and a third lens group G3 having a positive refractive power in order from the object side along the optical axis Z. In the example shown in FIG. 1, an aperture stop St is provided between the first lens group G1 and the second lens group G2. Note that the aperture stop St shown in FIG. 1 does not necessarily represent the size or shape, but the position on the optical axis Z.

As it is preferable that, when the zoom lens is applied to an imaging apparatus, a cover glass and various types of filters, such as an infrared cut filter, a low-pass filter, and the like, are disposed between the optical system and the image plane Sim according to the structure on the imaging apparatus side to which the lens is attached, FIG. 1 illustrates an example in which a parallel plate optical member PP assuming these is disposed between the lens system and the image plane Sim. But the optical member PP is not an essential component of the zoom lens of the present invention.

The zoom lens is configured such that, upon zooming from the wide angle end to the telephoto end, the first lens group G1, the second lens group G2, and the third lens group G3 are moved along the optical axis such that the distance between the first lens group G1 and the second lens group G2 is reduced, and the distance between the second lens group G2 and the third lens group G3 is increased. In the example shown in FIG. 1, the aperture stop St is integrally moved with the second lens group G2 upon zooming from the wide angle end to the telephoto end.

The lens arrangement of each lens group of the example shown in FIG. 1 is as follows. That is, the first lens group G1 is composed of a negative lens L1 and a positive lens L2 in order from the object side. The second lens group G2 is composed of a positive lens L3, a positive lens L4, a negative lens L5, and a positive lens L6 in order from the object side. The third lens group G3 is composed of a positive lens L7. The lenses L4 and L5 are cemented and the other lenses are uncemented single lenses. Both surfaces of the lens L1, lens L2, and lens L3, and the image side surface of the lens L6 are aspherical. Note that, in the zoom lens of the present invention, the object side of the lens L7 may be aspherical as in the example shown in FIG. 2, instead of the image side surface of the lens L6.

The first lens group G1 of the zoom lens is composed essentially of a lens L1 having a negative refractive power and a lens L2 having a positive refractive power in order from the object side. The two lens configuration of the first lens group G1 allows compact configuration, and the power arrangement of negative lens and positive lens in order from the object side is advantageous for compact and wide angle configuration.

The zoom lens is configured to satisfy conditional expressions (1) to (5) given below:

$$0.50<(r1+r2)/(r1-r2)<1.00 \tag{1}$$

$$0.06<d1/DG1<0.11 \tag{2}$$

$$1.94<nd2 \tag{3}$$

$$1.80<nd1 \tag{4}$$

$$40.0<vd1 \tag{5}$$

where r1: radius of curvature of the object side surface of the negative lens in the first lens group, r2: radius of curvature of the image side surface of the negative lens in the first lens group, d1: center thickness of the negative lens in the first lens group, DG1: distance from the most object side surface in the first lens group to the most image side surface in the first lens group on the optical axis, nd2: refractive index of the positive lens in the first lens group with respect to the d-line, nd1: refractive index of the negative lens in the first lens group with respect to the d-line, and vd1: Abbe number of the negative lens in the first lens group with respect to the d-line.

If the zoom lens falls to or below the lower limit of the conditional expression (1), the center-edge thickness ratio of the negative lens L1 in the first lens group G1 is increased and the power of the lens is increased, which is undesirable as distortion is increased. Further, as the thickness ratio is large, the peripheral thickness of the lens L1 is increased largely, which is undesirable as it is disadvantageous for the overall lens thickness in the collapsed state. If the zoom lens reaches or exceeds the upper limit of the conditional expression (1), the power of the lens is reduced and it is difficult to maintain a wide angle of view. An attempt to increase the angle of view causes the number of lenses to be increased, and it is difficult to reduce the overall lens thickness in the collapsed state, which is undesirable. Satisfaction of the conditional expression (1) is advantageous for satisfactory correction of distortion, suppression of overall lens thickness in the collapsed state, and angle increase.

If the zoom lens falls to or below the conditional expression (2), the center thickness of the negative lens L1 in the first lens group G1 is reduced and the manufacturability of the lens L1 is degraded so that it is difficult to stably realize the zoom lens. If the zoom lens reaches or exceeds the upper limit of the conditional expression (2), an attempt to maintain the power of the negative lens L1 in the first lens group G1 within a preferable range will result in an increase in the peripheral thickness of the lens L1, which is undesirable as it is disadvantageous for the overall lens thickness in the collapsed state. Satisfaction of the conditional expression (2) is advantageous for manufacturability and suppression of the overall lens thickness in the collapsed state.

If the zoom lens falls to or below the lower limit of the conditional expression (3), an attempt to maintain the power of the positive lens L2 in the first lens group G1 within a preferable range will result in that the absolute value of the curvature of the lens L2 is increased, and the center thickness needs to be increased to ensure the edge thickness, so that the thickness of the first lens group G1 is increased, which is disadvantageous for downsizing and undesirable. Satisfaction of the conditional expression (3) is advantageous for downsizing. Further, satisfaction of the conditional expression (3) allows ease of correcting spherical aberration on the telephoto side and facilitates realization of an optical system having a small F-number.

If the zoom lens falls to or below the lower limit of the conditional expression (4), the power of the first lens group G1 is reduced and a wide angle configuration is difficult to realize, or an attempt to maintain the power will result in an increase in the thickness of the first lens group G1, which is disadvantageous for downsizing and undesirable. Satisfaction of the conditional expression (4) is advantageous for a wide angle configuration and downsizing.

If the zoom lens falls to or below the lower limit of the conditional expression (5), a large amount of lateral chromatic aberration is generated, which is undesirable. The generation of lateral chromatic aberration may be suppressed by shifting the material of the positive lens L2 in the first lens group G1 to the high dispersion side but this method is undesirable as it is difficult to take balance due to shortage of suitable materials. Satisfaction of the conditional expression (5) is advantageous for satisfactory correction of lateral chromatic aberration.

As described above, in a three-group zoom lens in which negative, positive, and positive lens groups are disposed in order from the object side, the two lens arrangement of a negative lens and a positive lens disposed in order from the object side for the first lens group G1 and simultaneous satisfaction of the conditional expressions (1) to (5) allow a wide angle zoom lens, yet having a small F-number, can be formed compact, and has favorable optical performance, to be realized.

Further, the zoom lens preferably satisfies a conditional expression (6) given below:

$$2.40<f1/fw<-1.70 \tag{6}$$

where f1: focal length of the first lens group, and fw: focal length of the entire system at the wide angle end.

If the zoom lens falls to or below the lower limit of the conditional expression (6), the power of the first lens group G1 is reduced and the overall length of the lens system is increased. This is undesirable as the size of the lens barrel is also increased and downsizing at the time of collapse is difficult. If the zoom lens reaches or exceeds the upper limit of the conditional expression (6), it is difficult to satisfactorily correct field curvature and spherical aberration generated in the first lens group G1, which is undesirable. Satisfaction of the conditional expression (6) is advantageous for downsizing and satisfactory correction of field curvature and spherical aberration.

To further enhance the foregoing operational advantages of each of the conditional expressions (1) to (6), the zoom lens more preferably satisfies conditional expressions (1') to (6') given below, instead of each of the conditional expressions (1) to (6). A preferable embodiment may be an embodiment that satisfies any one of the conditional expressions (1') to (6') or an embodiment that satisfies any combination thereof.

$$0.60<(r1+r2)/(r1-r2)<0.90 \quad (1')$$

$$0.07<d1/DG1<0.10 \quad (2')$$

$$1.98<nd2 \quad (3')$$

$$1.81<nd1 \quad (4')$$

$$42.0<vd1 \quad (5')$$

$$2.20<f1/fw<-1.90 \quad (6')$$

In the zoom lens, at least one surface of the negative lens L1 in the first lens group G1 is aspherical. Use of an aspherical lens as the lens L1 allows satisfactory correction of distortion mainly at the wide angle end in addition to field curvature.

Further, in the zoom lens, at least one surface of the positive lens L2 in the first lens group G1 is aspherical. Use of an aspherical lens as the lens L2 allows satisfactory correction of spherical aberration mainly at the telephoto end.

The second lens group G2 of the zoom lens is preferably composed essentially of a positive lens, a positive lens, a negative lens, and a positive lens in order from the object side. Such a configuration, although has a small F-number, allows spherical aberrations generated in the second lens group G2 to be well balanced, and is also advantageous for the correction of various aberrations of off-axis light. An attempt to correct spherical aberration and other aberrations by further adding a lens will result in disadvantage for downsizing at the time of collapse. Therefore, the formation of the second lens group G2 with four lenses with the foregoing power arrangement is preferable for balancing between the aberration correction and downsizing.

The zoom lens is preferably configured to perform focusing by moving only the third lens group G3 in an optical axis direction. Focus performance by a lens group other than the third lens group G3 causes the size of the drive system for moving the lens group to be increased, which is disadvantageous for downsizing and undesirable.

Further, the zoom lens preferably has a half angel of view of greater than 38° at the wide angle end. A half angel of view of less than or equal to 38° cannot fully respond to the recent demand for a wide angle configuration.

The foregoing preferable configurations may be combined in any way, and are preferably employed selectively, as appropriate, according to the specifications required of the zoom lens. For example, the zoom lens of the present embodiment can be favorably applied to a small zoom lens having a half angle of view of 40° or more with an F-number of 2 or less.

Specific examples of the zoom lens of the present invention will be described.

Example 1

A cross-sectional view illustrating the configuration of a zoom lens of Example 1 is as shown in FIG. 1. The schematic configuration of the zoom lens of Example 1 is as follows. That is, the zoom lens of Example 1 consists of a first lens group G1 having a negative refractive power, a second lens group G2 having a positive refractive power, and a third lens group G3 having a positive refractive power, disposed in order from the object side. The zoom lens is configured such that, upon zooming from the wide angle end to the telephoto end, the first lens group G1, the second lens group G2, and the third lens group G3 are moved along the optical axis Z such that the distance between the first lens group G1 and the second lens group G2 is reduced, and the distance between the second lens group G2 and the third lens group G3 is increased.

The first lens group G1 is composed of a lens L1 having a biconcave shape in the paraxial region and a lens L2 having a positive meniscus shape with a convex surface on the object side in the paraxial region, in order from the object side. The second lens group G2 is composed of a lens L3 having a biconvex shape in the paraxial region, a lens L4 having a biconvex shape, a lens L5 having a biconcave shape, and a lens L6 having a positive meniscus shape with a convex surface on the image side, in order from the object side. The third lens group G3 is composed of a lens L7 having a biconvex shape. The lenses L4 and L5 are cemented and the other lenses are uncemented single lenses. Both surfaces of the lens L1, lens L2, and lens L3, and the image side surface of the lens L6 are aspherical. An aperture stop St is disposed between the first lens group G1 and the second lens group G2 and is moved integrally with the second lens group G2 upon zooming from the wide angle end to the telephoto end. Note that the aperture stop St shown in FIG. 1 does not necessarily represent the size or the shape, but indicates the position on the optical axis Z. FIG. 1 illustrates an example in which a parallel plate optical member PP assuming various types of filters, a cover glass, and the like is disposed between the lens system and the image plane Sim. Further, the movement trajectories of the respective lens groups upon zooming from the wide angle end to the telephoto end are as shown in FIG. 1.

Table 1 shows basic lens data of the zoom lens of Example 1. The si column of Table 1 indicates the $i^{th}$ surface number in which a number i (i=1, 2, 3, - - - ) is given to each surface in a serially increasing manner toward the image side with the object side surface of the most object side constituent element being taken as the first surface. The ri column indicates the radius of curvature of the $i^{th}$ surface. The di column indicates the surface distance on the optical axis Z between the $i^{th}$ surface and the $(i+1)^{th}$ surface. The ndj column indicates the refractive index of the $j^{th}$ optical element with respect to the d-line (wavelength 587.56 nm) in which a number j (j=1, 2, 3, - - - ) is given to each constituent element in a serially increasing manner toward the image side with the most object side constituent element being taken as the first element, and the vdj column indicates the Abbe number of the $j^{th}$ optical element with respect to the d-line.

Note that the aperture stop St and the optical member PP are included in the basic lens data, and the surface number column corresponding to the aperture stop St includes the word "(St)" in addition to the surface number. The sign of the radius of curvature is positive if the surface shape is convex on the object side and negative if it is convex on the image side. The numerical value at the bottom of the di column indicates the distance between the image side surface of the optical member PP and the image plane Sim. Further, * mark is attached to the surface number of an aspherical surface and the value of paraxial radius of curvature is shown in the radius of curvature column of the aspherical surface.

Table 2 shows aspherical surface coefficients of the aspherical surfaces of Example 1. The "E-n" (n: integer) in the values of aspherical surface coefficients represents "×10$^{-n}$". The aspherical surface coefficients represent values of coefficients KA and Am (m=3, 4, 5, - - - ) in the aspherical surface expression represented by the formula given below, $$Zd = C \cdot h^2 / \{1 + (1 - KA \cdot C^2 \cdot h^2)^{1/2}\} + \Sigma Am \cdot h^m$$

where

Zd: depth of aspherical surface (length of vertical line extended from a point on the aspherical surface at height h to a flat surface orthogonal to the optical axis to which the aspherical apex contacts)

h: height (distance from the optical axis to the lens surface)

C: paraxial curvature

KA, Am: aspherical surface coefficients (m=3, 4, 5, - - - )

Table 3 shows specs of the zoom lens of Example 1 at the wide angle end, in the intermediate focal length state, and at the telephoto end with respect to the d-line, and variable surface distance data. The symbols f, FNo., and 2ω in Table 3 represent focal length of the entire system, F-number, and total angle of view (in unit of degree) respectively.

The distance between the first lens group G1 and the aperture stop St, the distance between the second lens group G2 and the third lens group G3, and the distance between the third lens group G3 and the optical member PP are variable distances that change upon zooming, and DD [4], DD [12], and DD [14] are included in the places of the surface distance column corresponding to these distances in the basic lens data shown in Table 1. Table 3 shows the values of these surface distances at the wide angle end, in the intermediate focal length state, and at the telephoto end.

In each table shown below, "degree" is used as the unit of angle, and "mm" is used as the unit of length. But, other appropriate units may also be used, as optical systems can be used by proportionally enlarged or reduced. Further, each table shown below indicates values rounded to a predetermined digit.

TABLE 1

Example 1 Basic Lens Data

| si | ri | di | ndj | vdj |
|---|---|---|---|---|
| *1 | −67.4874 | 0.50 | 1.818170 | 42.56 |
| *2 | 7.1463 | 3.03 | | |
| *3 | 14.1587 | 2.70 | 1.997540 | 20.51 |
| *4 | 32.1691 | DD[4] | | |
| 5(St) | ∞ | 0.80 | | |
| *6 | 11.1775 | 3.10 | 1.740249 | 49.13 |
| *7 | −1360.9611 | 0.10 | | |
| 8 | 10.9788 | 2.81 | 1.592824 | 68.63 |
| 9 | −27.4790 | 0.50 | 1.728250 | 28.46 |
| 10 | 8.3026 | 1.40 | | |
| 11 | −52.8360 | 1.70 | 1.495151 | 82.07 |
| *12 | −14.7207 | DD[12] | | |
| 13 | 25.4719 | 2.75 | 1.592824 | 68.63 |
| 14 | −60.9423 | DD[14] | | |
| 15 | ∞ | 1.17 | 1.516798 | 64.20 |
| 16 | ∞ | 0.50 | | |

TABLE 2

Example 1 Aspherical Surface Coefficient

| si | 1 | 2 | 3 | 4 |
|---|---|---|---|---|
| KA | 6.923081E−04 | 5.029261E−02 | 1.047751E−01 | 8.727666E−02 |
| A3 | 6.436118E−04 | 1.083836E−03 | −9.817877E−06 | −2.943900E−04 |
| A4 | 1.825607E−04 | −2.191963E−04 | −2.626319E−04 | −1.130019E−04 |
| A5 | −1.119994E−05 | 4.710989E−05 | 1.997439E−05 | −2.028159E−06 |
| A6 | −1.646746E−06 | 7.023599E−06 | 3.333831E−06 | 2.163872E−06 |
| A7 | −7.703912E−08 | −1.298705E−07 | 2.121934E−07 | 2.022178E−07 |
| A8 | 1.478436E−09 | −1.018414E−07 | −8.221869E−09 | 3.030989E−14 |
| A9 | 7.905119E−10 | −1.369442E−08 | −4.025027E−09 | −2.875898E−09 |
| A10 | 1.045663E−10 | −1.061295E−09 | −6.126331E−10 | −5.889572E−10 |
| A11 | 9.201312E−12 | −2.351896E−11 | −6.420127E−11 | −7.739572E−11 |
| A12 | 5.280690E−13 | 8.942354E−12 | −4.928287E−12 | −7.482872E−12 |
| A13 | 1.079709E−15 | 2.124642E−12 | −1.860447E−13 | −4.159456E−13 |
| A14 | −4.557918E−15 | 3.313589E−13 | 2.075016E−14 | 2.823759E−14 |
| A15 | −7.164509E−16 | 4.418097E−14 | 6.921916E−15 | 1.312644E−14 |
| A16 | −7.878794E−17 | 5.286381E−15 | 1.183383E−15 | 2.510199E−15 |
| A17 | −9.284974E−18 | 5.298009E−16 | 1.690434E−16 | 3.428239E−16 |
| A18 | −1.507317E−18 | 2.303166E−17 | 2.031755E−17 | 3.168174E−17 |
| A19 | 7.573826E−20 | −9.403969E−18 | 1.545881E−18 | 9.319228E−20 |
| A20 | 1.586272E−20 | −4.327621E−18 | −1.226326E−19 | −8.437647E−19 |

TABLE 2-continued

Example 1 Aspherical Surface Coefficient

| si | 6 | 7 | 12 |
|---|---|---|---|
| KA | 1.295630E+00 | 5.362316E-01 | 1.203908E+00 |
| A3 | -1.289774E-04 | -3.622782E-05 | -3.457017E-05 |
| A4 | 3.268329E-06 | 5.560641E-05 | 3.837657E-04 |
| A5 | -9.397730E-06 | 4.284581E-06 | -6.867527E-05 |
| A6 | -7.477126E-07 | -1.999207E-06 | 8.837302E-06 |
| A7 | -8.585004E-08 | -5.656005E-07 | 3.858695E-06 |
| A8 | -2.711565E-08 | -7.621950E-08 | 2.856987E-07 |
| A9 | -6.271404E-09 | -4.168339E-09 | -9.868243E-08 |
| A10 | -9.060547E-10 | 7.636261E-10 | -3.531109E-08 |
| A11 | -5.930377E-11 | 2.787195E-10 | -4.483854E-09 |
| A12 | 9.521959E-12 | 4.878075E-11 | 8.710563E-10 |
| A13 | 3.847320E-12 | 4.749080E-12 | 5.255323E-10 |
| A14 | 7.074954E-13 | -2.723228E-13 | 1.343975E-10 |
| A15 | 5.478191E-14 | -2.611496E-13 | 1.672466E-11 |
| A16 | -1.091472E-14 | -7.571893E-14 | -2.840079E-12 |
| A17 | -5.362454E-15 | -1.519824E-14 | -2.413012E-12 |
| A18 | -1.239200E-15 | -1.985435E-15 | -7.346560E-13 |
| A19 | -1.363739E-16 | 3.806603E-17 | -7.247732E-14 |
| A20 | 2.959724E-17 | 1.402755E-16 | 6.285840E-14 |

TABLE 3

Example 1 Specs and Variable Surface Distance

| | WIDE | MIDDLE | TELE |
|---|---|---|---|
| Zoom Magnification | 1.0 | 1.9 | 3.7 |
| f | 6.61 | 12.22 | 24.43 |
| FNo. | 1.87 | 3.85 | 5.10 |
| 2ω[°] | 90.10 | 49.86 | 25.46 |
| DD[4] | 19.03 | 9.04 | 2.42 |
| DD[12] | 6.62 | 16.18 | 33.36 |
| DD[14] | 5.26 | 3.98 | 3.97 |

A to D of FIG. 7 are aberration diagrams of spherical aberration, astigmatism, distortion, and lateral chromatic aberration of the zoom lens of Example 1 at the wide angle end. E to H of FIG. 7 are aberration diagrams of spherical aberration, astigmatism, distortion, and lateral chromatic aberration of the zoom lens of Example 1 in the intermediate focal length state. I to L of FIG. 7 are aberration diagrams of spherical aberration, astigmatism, distortion, and lateral chromatic aberration of the zoom lens of Example 1 at the telephoto end. A to L of FIG. 7 are those when an object at infinity is in focus.

Each aberration diagram shows aberration with the d-line (wavelength 587.56 nm) as the reference wave length, but the spherical aberration diagram also illustrates aberrations with respect to the C-line (wavelength 656.27 nm) and the F-line (wavelength 486.13 nm). The lateral chromatic aberration diagram illustrates aberrations with respect to the C-line and the F-line. In the astigmatism diagram, the solid line illustrates astigmatism in the sagittal direction while the dotted line illustrates astigmatism in the tangential direction and the notes of line types include symbols (S) and (T) respectively. The "FNo." in the spherical aberration diagram represents the F-number and "ω" in the other aberration diagrams represents the half angle of view.

The each symbol in the data, its meaning, representation method, and the like described in Example 1 are applied also to the following examples unless otherwise specifically described, and duplicated description will be omitted herein below.

Example 2

Figure 2:
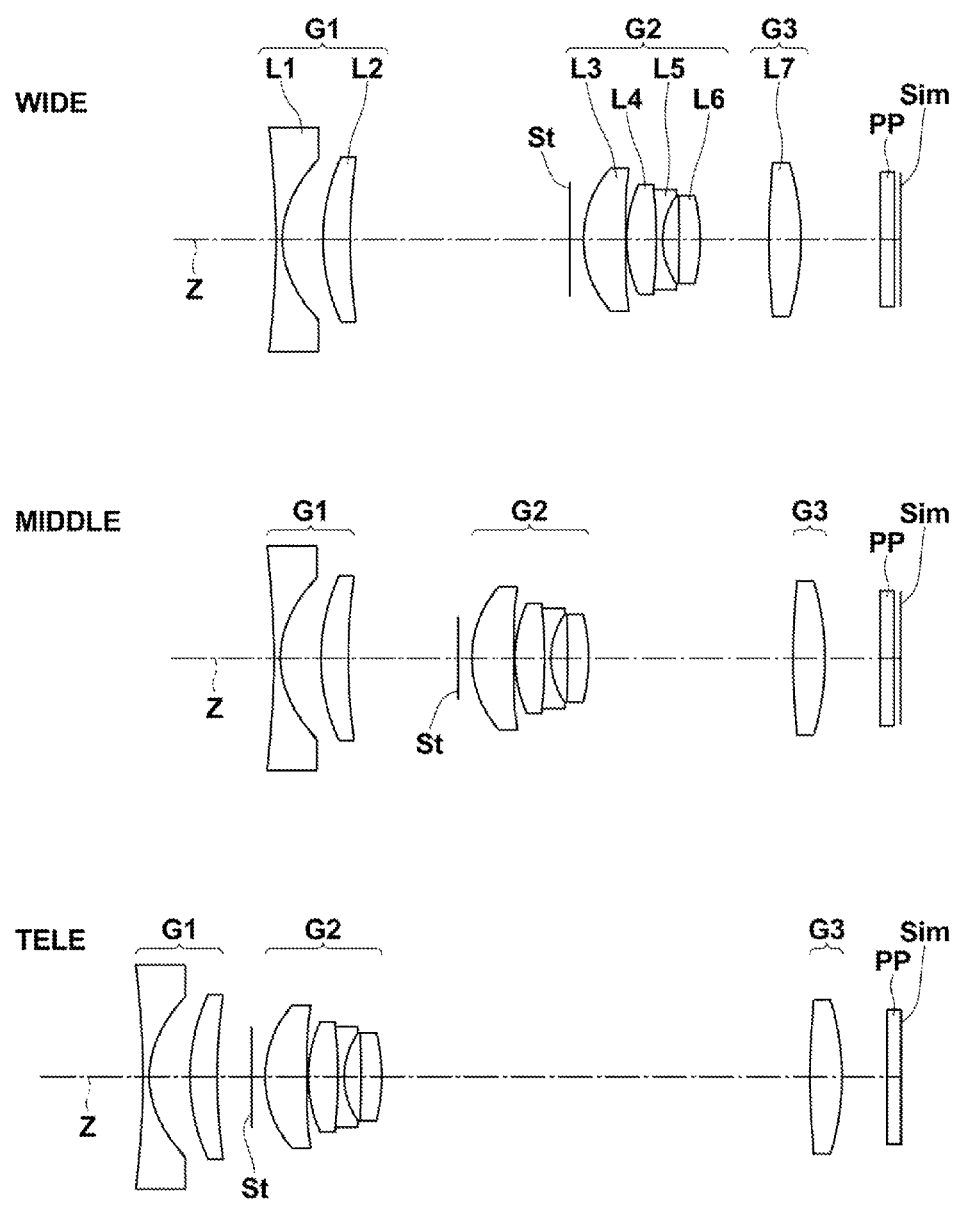
FIG. 2 is a cross-sectional view of a zoom lens of Example 2 of the present invention, illustrating the lens configuration thereof.

A cross-sectional view illustrating the configuration of a zoom lens of Example 2 is as shown in FIG. 2. The schematic configuration of the zoom lens of Example 2 is roughly identical to that of the zoom lens of Example 1 described above, but differs in that the lens L3 has a positive meniscus shape with a convex surface on the object side in the paraxial region, the image side surface of the lens L6 is spherical, and the object side surface of the lens L7 is aspherical. Tables 4, 5 and 6 show the basic lens data, aspherical surface coefficients, and specs and variable surface distance data of the zoom lens of Example 2 respectively. A to L of FIG. 8 are the respective aberration diagrams of the zoom lens of Example 2.

TABLE 4

Example 2 Basic Lens Data

| si | ri | di | ndj | vdj |
|---|---|---|---|---|
| *1 | -52.9991 | 0.50 | 1.851348 | 40.10 |
| *2 | 8.1250 | 3.30 | | |
| *3 | 16.9207 | 2.20 | 1.945945 | 17.98 |
| *4 | 47.7272 | DD [4] | | |
| 5 (St) | ∞ | 1.10 | | |
| *6 | 9.4431 | 3.40 | 1.743198 | 49.29 |
| *7 | 2500.0000 | 0.10 | | |
| 8 | 11.5419 | 2.41 | 1.592824 | 68.63 |
| 9 | -39.0415 | 0.50 | 1.728250 | 28.46 |
| 10 | 6.6598 | 1.35 | | |
| 11 | -100.9296 | 1.70 | 1.496999 | 81.54 |
| 12 | -15.4593 | DD [12] | | |
| *13 | 46.4784 | 2.60 | 1.568672 | 58.50 |
| 14 | -22.7271 | DD [14] | | |
| 15 | ∞ | 1.12 | 1.516798 | 64.20 |
| 16 | ∞ | 0.51 | | |

TABLE 5

Example 2 Aspherical Surface Coefficient

| | si | | | |
|---|---|---|---|---|
| | 1 | 2 | 3 | 4 |
| KA | 1.999999E+00 | 2.610530E-01 | 9.999876E-01 | 1.000001E+00 |
| A3 | 7.486471E-04 | 1.129775E-03 | -7.231236E-06 | -6.857073E-06 |
| A4 | -2.911609E-04 | -8.397990E-04 | -6.903397E-07 | -1.076369E-06 |
| A5 | 1.060606E-04 | 4.265837E-04 | -1.090318E-07 | -2.412586E-08 |
| A6 | 7.209415E-05 | -4.127528E-05 | -8.468728E-09 | -2.846469E-09 |
| A7 | -6.906674E-05 | -4.516518E-05 | -3.960143E-10 | -1.233868E-09 |
| A8 | 1.882875E-05 | 1.704739E-05 | -2.512127E-11 | -2.347022E-10 |
| A9 | -1.236787E-06 | -2.566611E-06 | -5.837219E-12 | -3.203443E-11 |
| A10 | -3.799657E-07 | 1.479805E-07 | -1.421294E-12 | -3.645560E-12 |
| A11 | 9.819393E-08 | 3.741438E-08 | -2.782103E-13 | -3.608639E-13 |
| A12 | -1.211835E-08 | -5.444271E-09 | -4.715069E-14 | -3.056810E-14 |
| A13 | 1.278340E-09 | -3.320578E-09 | -7.274081E-15 | -1.995243E-15 |
| A14 | -1.251811E-10 | 1.099030E-09 | -1.047114E-15 | -6.065962E-17 |
| A15 | 7.876960E-12 | -1.227403E-10 | -1.411615E-16 | 5.135121E-18 |
| A16 | -2.079792E-13 | 4.827527E-12 | -1.759698E-17 | -1.986150E-19 |
| A17 | — | — | -1.938062E-18 | -6.205448E-19 |
| A18 | — | — | -1.622517E-19 | -2.459332E-19 |
| A19 | — | — | -1.815798E-21 | -6.917066E-20 |
| A20 | — | — | 3.565060E-21 | -1.656471E-20 |

| | si | | |
|---|---|---|---|
| | 6 | 7 | 13 |
| KA | 1.212951E+00 | 1.035772E+00 | 1.999766E+00 |
| A3 | -5.891375E-04 | -8.832702E-04 | -8.300961E-04 |
| A4 | 1.116130E-03 | 1.830137E-03 | 7.152939E-04 |
| A5 | -1.096184E-03 | -1.322661E-03 | -4.555151E-04 |
| A6 | 5.078767E-04 | 1.511184E-04 | 1.495108E-04 |
| A7 | -8.816242E-05 | 5.200416E-04 | -2.154164E-05 |
| A8 | -1.375768E-05 | -4.254920E-04 | -1.317028E-06 |
| A9 | 6.259443E-06 | 1.575748E-04 | 8.044293E-07 |
| A10 | 2.589734E-07 | -2.880712E-05 | -5.953897E-08 |
| A11 | -2.358466E-07 | 8.203690E-07 | -2.251138E-09 |
| A12 | -3.340705E-08 | 8.580585E-07 | -8.786291E-10 |
| A13 | 1.881873E-08 | -2.340035E-07 | 2.107203E-10 |
| A14 | -1.966224E-09 | 3.439114E-08 | 4.242001E-12 |
| A15 | 5.523252E-12 | -3.019039E-09 | -2.741833E-12 |
| A16 | 5.853581E-12 | 1.203736E-10 | 1.346746E-13 |

TABLE 6

Example 2 Specs and Variable Surface Distance

| | WIDE | MIDDLE | TELE |
|---|---|---|---|
| Zoom Magnification | 1.0 | 1.9 | 3.7 |
| f | 6.84 | 12.66 | 25.28 |
| FNo. | 1.98 | 3.85 | 5.10 |
| 2ω[°] | 88.12 | 47.94 | 24.28 |
| DD[4] | 17.82 | 8.93 | 2.79 |
| DD[12] | 5.56 | 16.58 | 34.70 |
| DD[14] | 6.45 | 4.47 | 3.68 |

Example 3

Figure 3:
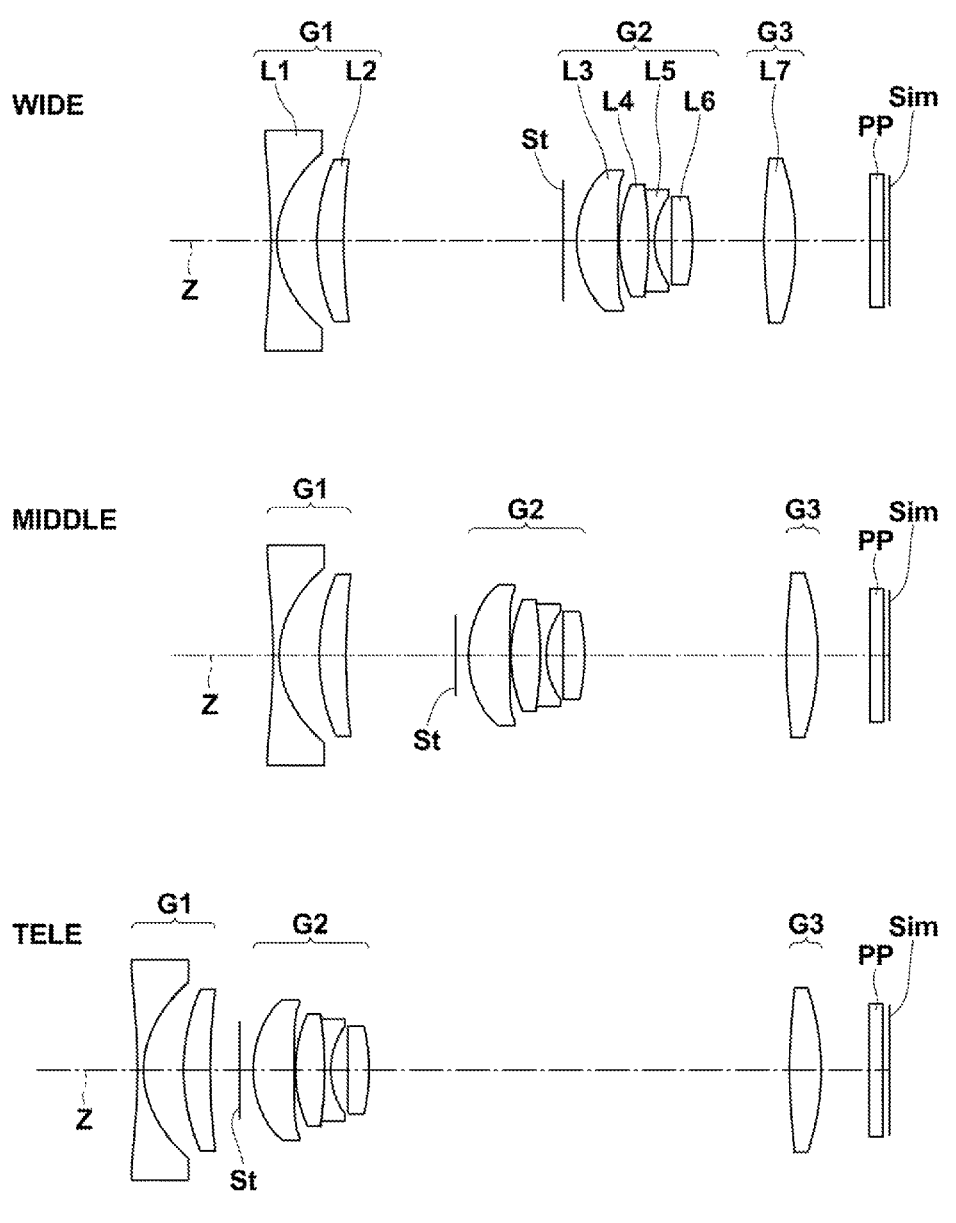
FIG. 3 is a cross-sectional view of a zoom lens of Example 3 of the present invention, illustrating the lens configuration thereof.

A cross-sectional view illustrating the configuration of a zoom lens of Example 3 is as shown in FIG. 3. The schematic configuration of the zoom lens of Example 3 is roughly identical to that of the zoom lens of Example 2 described above. Tables 7, 8 and 9 show the basic lens data, aspherical surface coefficients, and specs and variable surface distance data of the zoom lens of Example 3 respectively. A to L of FIG. 9 are the respective aberration diagrams of the zoom lens of Example 3.

TABLE 7

Example 3 Basic Lens Data

| si | ri | di | ndj | vdj |
|---|---|---|---|---|
| *1 | -48.2150 | 0.50 | 1.851348 | 40.10 |
| *2 | 8.3074 | 3.31 | | |
| *3 | 17.7379 | 2.20 | 1.945945 | 17.98 |
| *4 | 55.2264 | DD[4] | | |
| 5 (St) | ∞ | 1.10 | | |
| *6 | 9.2517 | 3.40 | 1.743198 | 49.29 |
| *7 | 11768.2389 | 0.10 | | |
| 8 | 12.1703 | 2.41 | 1.592824 | 68.63 |
| 9 | -31.6342 | 0.50 | 1.728250 | 28.46 |
| 10 | 6.6588 | 1.40 | | |
| 11 | -1178.6884 | 1.75 | 1.496999 | 81.54 |
| 12 | -17.3350 | DD[12] | | |
| *13 | 42.3314 | 2.60 | 1.568672 | 58.50 |
| 14 | -22.7273 | DD[14] | | |
| 15 | ∞ | 1.12 | 1.516798 | 64.20 |
| 16 | ∞ | 0.50 | | |

TABLE 8

Example 3 Aspherical Surface Coefficient

| | si | | | |
|---|---|---|---|---|
| | 1 | 2 | 3 | 4 |
| KA | 1.899911E+00 | 2.504625E−01 | 9.997943E−01 | 9.999450E−01 |
| A3 | 1.464328E−03 | 1.569318E−03 | −3.363413E−05 | −3.846821E−05 |
| A4 | −8.207413E−04 | −7.527244E−04 | −4.102973E−06 | −5.169164E−06 |
| A5 | 4.519368E−04 | 3.296059E−06 | −3.216976E−07 | −1.767697E−07 |
| A6 | −1.562506E−04 | 3.141758E−04 | 1.198260E−08 | 1.406337E−09 |
| A7 | 2.908510E−05 | −2.285775E−04 | 6.178454E−09 | −5.136001E−10 |
| A8 | −4.069968E−06 | 7.805930E−05 | 9.506904E−10 | −1.649620E−10 |
| A9 | 8.688854E−07 | −1.413101E−05 | 1.087023E−10 | −1.913996E−11 |
| A10 | −1.383404E−07 | 1.158493E−06 | 1.081844E−11 | −9.498813E−13 |
| A11 | 7.624669E−09 | −5.019196E−08 | 1.000731E−12 | 1.027282E−13 |
| A12 | −6.167608E−10 | 3.576318E−08 | 9.551196E−14 | 3.552414E−14 |
| A13 | 1.899972E−10 | −9.505714E−09 | 9.643910E−15 | 6.335732E−15 |
| A14 | 6.414306E−12 | 4.225464E−10 | 1.191181E−15 | 8.971409E−16 |
| A15 | −5.304564E−12 | 6.202618E−11 | 1.860395E−16 | 1.258340E−16 |
| A16 | 3.969995E−13 | 1.843387E−11 | 3.139815E−17 | 1.932490E−17 |
| A17 | −3.172998E−14 | −5.990270E−12 | 4.916206E−18 | 3.580297E−18 |
| A18 | 8.157734E−15 | 4.419652E−13 | 6.765752E−19 | 7.413535E−19 |
| A19 | −8.244354E−16 | 2.573465E−15 | 7.340603E−20 | 1.623214E−19 |
| A20 | 2.656964E−17 | −9.819330E−16 | 7.300553E−21 | 3.340378E−20 |

| | si | | |
|---|---|---|---|
| | 6 | 7 | 13 |
| KA | 1.202969E+00 | 1.675441E+00 | 1.413713E+00 |
| A3 | −5.752476E−04 | −5.456374E−04 | −2.567629E−04 |
| A4 | 1.246007E−03 | 1.061726E−03 | −7.321594E−06 |
| A5 | −1.513062E−03 | −7.804781E−04 | −6.451056E−05 |
| A6 | 9.307460E−04 | 3.426800E−04 | 6.981431E−05 |
| A7 | −2.559142E−04 | −2.850981E−05 | −3.117657E−05 |
| A8 | −1.527347E−05 | −3.656860E−05 | 6.711133E−06 |
| A9 | 2.727388E−05 | 1.379701E−05 | −8.456921E−07 |
| A10 | −4.451460E−06 | −4.383881E−07 | 1.153667E−07 |
| A11 | −6.790182E−07 | −7.147399E−07 | −1.322751E−08 |
| A12 | 1.949475E−07 | 1.512958E−07 | −3.259107E−09 |
| A13 | 2.206283E−08 | −1.746234E−09 | 1.851637E−09 |
| A14 | −6.759809E−09 | −5.085787E−09 | −3.318828E−10 |
| A15 | −7.614239E−10 | 1.328002E−09 | 3.406752E−12 |
| A16 | 2.095323E−10 | −1.579142E−10 | 6.640546E−12 |
| A17 | 2.583771E−11 | 1.090986E−11 | −4.050730E−13 |
| A18 | −9.982768E−12 | −2.546225E−12 | −1.020338E−13 |
| A19 | 9.472780E−13 | 4.990808E−13 | 1.410138E−14 |
| A20 | −3.055210E−14 | −3.043691E−14 | −4.876365E−16 |

TABLE 9

Example 3 Specs and Variable Surface Distance

| | WIDE | MIDDLE | TELE |
|---|---|---|---|
| Zoom Magnification | 1.0 | 1.9 | 3.7 |
| f | 6.84 | 12.66 | 25.29 |
| FNo. | 1.85 | 3.85 | 5.10 |
| 2ω[°] | 88.12 | 47.98 | 24.24 |
| DD[4] | 18.12 | 9.01 | 2.43 |
| DD[12] | 5.87 | 16.64 | 34.67 |
| DD[14] | 6.13 | 4.29 | 3.97 |

Example 4

Figure 4:
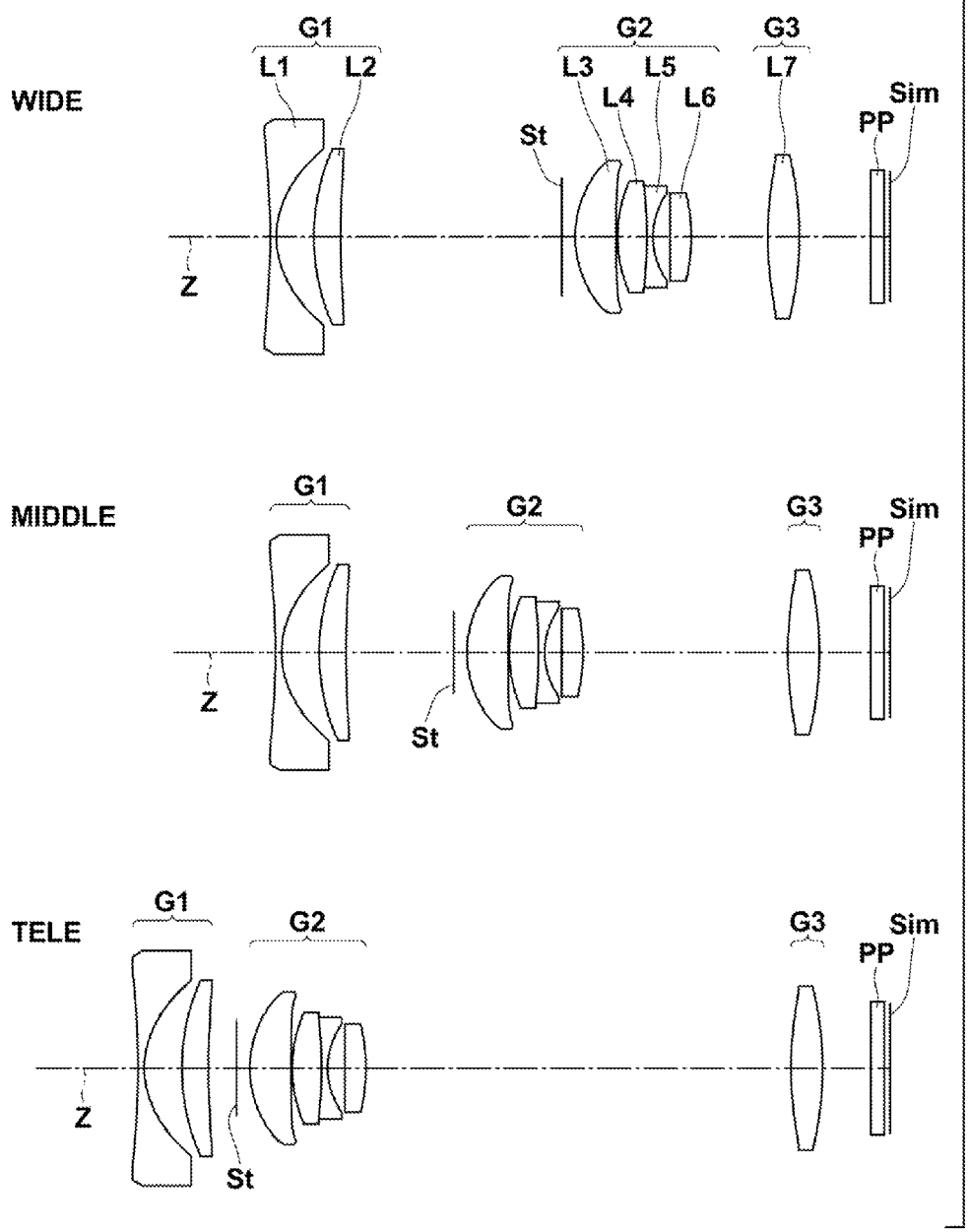
FIG. 4 is a cross-sectional view of a zoom lens of Example 4 of the present invention, illustrating the lens configuration thereof.

A cross-sectional view illustrating the configuration of a zoom lens of Example 4 is as shown in FIG. 4. The schematic configuration of the zoom lens of Example 4 is roughly identical to that of the zoom lens of Example 2 described above but differs from Example 2 in that the lens L6 has a biconvex shape. Tables 10, 11 and 12 show the basic lens data, aspherical surface coefficients, and specs and variable surface distance data of the zoom lens of Example 4 respectively. A to L of FIG. 10 are the respective aberration diagrams of the zoom lens of Example 4.

TABLE 10

Example 4 Basic Lens Data

| si | ri | di | ndj | vdj |
|---|---|---|---|---|
| *1 | −48.8085 | 0.50 | 1.851348 | 40.10 |
| *2 | 8.0009 | 3.10 | | |
| *3 | 18.1865 | 2.20 | 2.001784 | 19.32 |
| *4 | 63.6176 | DD[4] | | |
| 5 (St) | ∞ | 1.10 | | |
| *6 | 9.4122 | 3.40 | 1.743198 | 49.29 |
| *7 | 11387.2258 | 0.10 | | |
| 8 | 12.3174 | 2.41 | 1.592824 | 68.63 |
| 9 | −39.7097 | 0.50 | 1.728250 | 28.46 |
| 10 | 6.6847 | 1.40 | | |
| 11 | 2057.2276 | 1.75 | 1.496999 | 81.54 |
| 12 | −16.4293 | DD[12] | | |
| *13 | 29.8603 | 2.60 | 1.568672 | 58.50 |
| 14 | −29.9730 | DD[14] | | |
| 15 | ∞ | 1.12 | 1.516798 | 64.20 |
| 16 | ∞ | 0.50 | | |

TABLE 11

Example 4 Aspherical Surface Coefficient

| | si | | | |
|---|---|---|---|---|
| | 1 | 2 | 3 | 4 |
| KA | 1.927007E+00 | 2.469069E-01 | 9.992477E-01 | 1.442964E+00 |
| A3 | 1.509239E-03 | 1.488012E-03 | -2.747292E-04 | -2.020537E-04 |
| A4 | -7.356746E-04 | -7.118205E-04 | -4.403335E-05 | -5.486211E-05 |
| A5 | 4.062201E-04 | 7.165524E-06 | -5.069562E-07 | -3.210472E-07 |
| A6 | -1.411571E-04 | 2.839503E-04 | 5.311323E-07 | 5.578752E-07 |
| A7 | 2.624348E-05 | -2.062516E-04 | 9.360437E-08 | 5.302013E-08 |
| A8 | -3.672883E-06 | 7.045235E-05 | 1.003977E-08 | 2.137250E-09 |
| A9 | 7.842565E-07 | -1.275304E-05 | 7.062747E-10 | -2.292639E-11 |
| A10 | -1.248418E-07 | 1.045513E-06 | 1.172356E-11 | -5.399106E-12 |
| A11 | 6.882005E-09 | -4.530782E-08 | -6.857607E-12 | 4.664736E-13 |
| A12 | -5.566142E-10 | 3.227449E-08 | -1.518137E-12 | 8.168838E-14 |
| A13 | 1.714668E-10 | -8.579144E-09 | -2.274518E-13 | -2.849101E-14 |
| A14 | 5.787833E-12 | 3.813212E-10 | -2.704657E-14 | -1.384507E-14 |
| A15 | -4.787497E-12 | 5.597657E-11 | -2.576184E-15 | -3.493086E-15 |
| A16 | 3.582814E-13 | 1.663652E-11 | -1.754908E-16 | -6.509657E-16 |
| A17 | -2.863674E-14 | -5.406193E-12 | 3.860837E-19 | -9.112883E-17 |
| A18 | 7.362392E-15 | 3.988789E-13 | 2.352825E-18 | -8.411602E-18 |
| A19 | -7.440402E-16 | 2.323181E-15 | 4.500161E-19 | 3.860295E-19 |
| A20 | 2.398074E-17 | -8.861798E-16 | 3.991574E-20 | 4.274764E-19 |

| | si | | |
|---|---|---|---|
| | 6 | 7 | 13 |
| KA | 1.174528E+00 | 4.900797E-01 | 1.187491E+00 |
| A3 | -6.240173E-04 | -6.218243E-04 | -2.041829E-04 |
| A4 | 1.236880E-03 | 1.043096E-03 | -7.773821E-06 |
| A5 | -1.512441E-03 | -7.833670E-04 | -6.556539E-05 |
| A6 | 9.303736E-04 | 3.421226E-04 | 7.035792E-05 |
| A7 | -2.559829E-04 | -2.859463E-05 | -3.111186E-05 |
| A8 | -1.528658E-05 | -3.658623E-05 | 6.715318E-06 |
| A9 | 2.727137E-05 | 1.379183E-05 | -8.456706E-07 |
| A10 | -4.451831E-06 | -4.395265E-07 | 1.153011E-07 |
| A11 | -6.790587E-07 | -7.149010E-07 | -1.324672E-08 |
| A12 | 1.949455E-07 | 1.512834E-07 | -3.263999E-09 |
| A13 | 2.206322E-08 | -1.745399E-09 | 1.850598E-09 |
| A14 | -6.759730E-09 | -5.085221E-09 | -3.320138E-10 |
| A15 | -7.614185E-10 | 1.328121E-09 | 3.409223E-12 |
| A16 | 2.095320E-10 | -1.578971E-10 | 6.643974E-12 |
| A17 | 2.583756E-11 | 1.091087E-11 | -4.040676E-13 |
| A18 | -9.982828E-12 | -2.546611E-12 | -1.019088E-13 |
| A19 | 9.472527E-13 | 4.989070E-13 | 1.410185E-14 |
| A20 | -3.055897E-14 | -3.048432E-14 | -4.919701E-16 |

TABLE 12

Example 4 Specs and Variable Surface Distance

| | WIDE | MIDDLE | TELE |
|---|---|---|---|
| Zoom Magnification | 1.0 | 1.9 | 3.7 |
| f | 6.85 | 12.67 | 25.33 |
| FNo. | 1.87 | 3.85 | 5.10 |
| 2ω[°] | 88.04 | 48.04 | 24.30 |
| DD[4] | 18.22 | 8.87 | 2.30 |
| DD[12] | 6.31 | 16.86 | 35.01 |
| DD[14] | 5.85 | 4.21 | 3.97 |

Example 5

Figure 5:
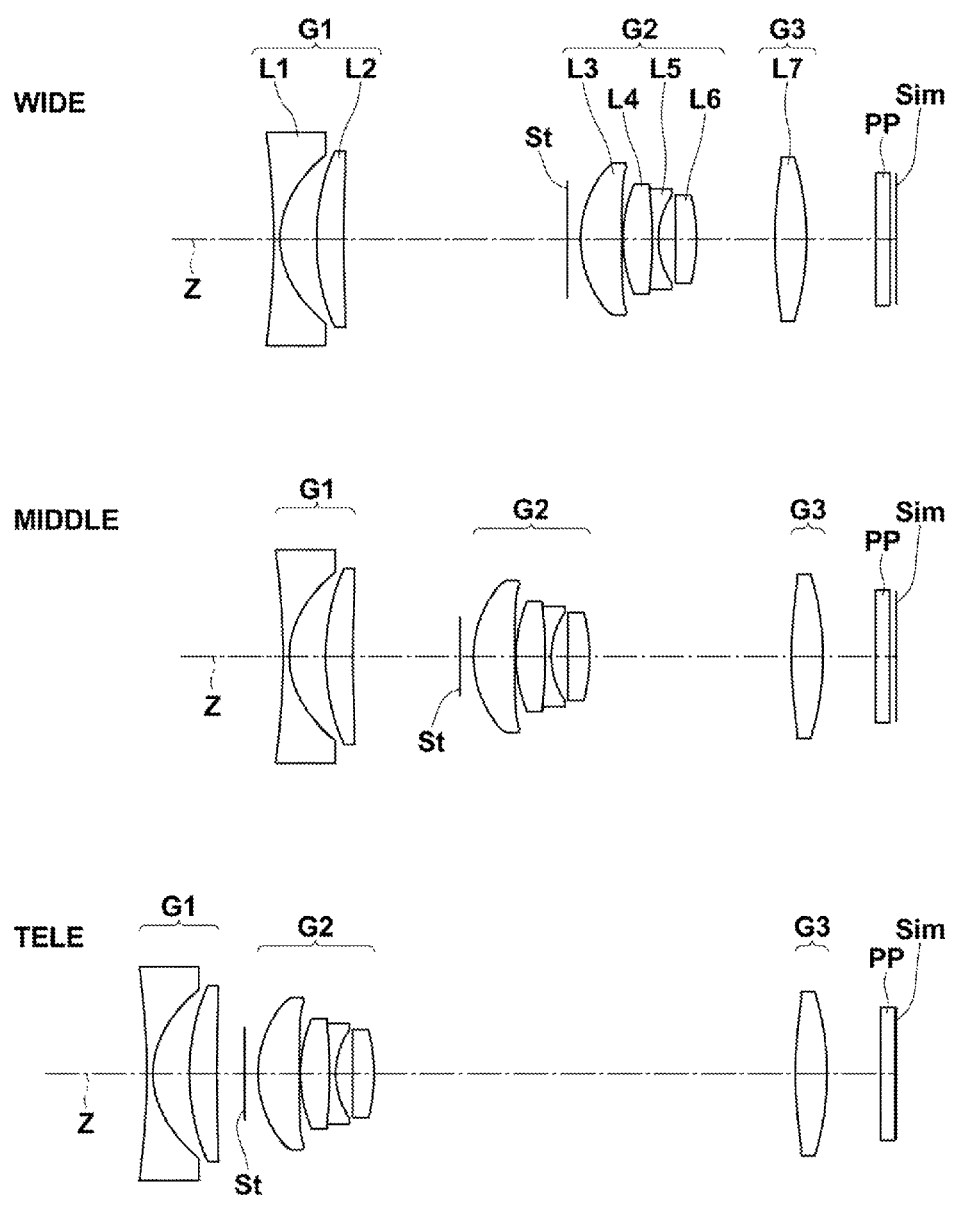
FIG. 5 is a cross-sectional view of a zoom lens of Example 5 of the present invention, illustrating the lens configuration thereof.

A cross-sectional view illustrating the configuration of a zoom lens of Example 5 is as shown in FIG. 5. The schematic configuration of the zoom lens of Example 5 is roughly identical to that of the zoom lens of Example 2 described above. Tables 13, 14 and 15 show the basic lens data, aspherical surface coefficients, and specs and variable surface distance data of the zoom lens of Example 5 respectively. A to L of FIG. 11 are the respective aberration diagrams of the zoom lens of Example 5.

TABLE 13

Example 5 Basic Lens Data

| si | ri | di | ndj | vdj |
|---|---|---|---|---|
| *1 | -44.0029 | 0.50 | 1.820798 | 42.71 |
| *2 | 7.5512 | 3.00 | | |
| *3 | 18.6306 | 2.25 | 1.999000 | 20.48 |
| *4 | 78.2416 | DD[4] | | |
| 5 (St) | ∞ | 1.10 | | |
| *6 | 9.5476 | 3.40 | 1.743198 | 49.29 |
| *7 | 756.6887 | 0.10 | | |
| 8 | 12.4744 | 2.41 | 1.592824 | 68.63 |
| 9 | -41.2318 | 0.50 | 1.728250 | 28.46 |
| 10 | 6.8968 | 1.40 | | |
| 11 | -1508.5284 | 1.75 | 1.496999 | 81.54 |
| 12 | -15.4255 | DD[12] | | |
| *13 | 34.4464 | 2.60 | 1.568672 | 58.50 |
| 14 | -24.6969 | DD[14] | | |
| 15 | ∞ | 1.17 | 1.516798 | 64.20 |
| 16 | ∞ | 0.51 | | |

TABLE 14

Example 5 Aspherical Surface Coefficient

| | si | | | |
|---|---|---|---|---|
| | 1 | 2 | 3 | 4 |
| KA  | 1.941182E+00  | 2.581354E−01  | 9.934613E−01  | 1.936452E+00 |
| A3  | 1.534431E−03  | 1.433442E−03  | −2.941207E−04 | −2.331962E−04 |
| A4  | −6.944363E−04 | −6.979328E−04 | −7.878646E−05 | −8.041827E−05 |
| A5  | 3.856557E−04  | 6.817889E−06  | 3.550300E−06  | 8.399387E−07 |
| A6  | −1.342201E−04 | 2.841986E−04  | 1.262130E−06  | 8.271081E−07 |
| A7  | 2.491590E−05  | −2.061850E−04 | 1.266135E−07  | 7.523126E−08 |
| A8  | −3.490273E−06 | 7.045611E−05  | 7.034492E−09  | 2.794631E−09 |
| A9  | 7.450241E−07  | −1.275394E−05 | −1.030900E−10 | −2.230561E−10 |
| A10 | −1.185946E−07 | 1.045221E−06  | −9.183985E−11 | −6.334422E−11 |
| A11 | 6.538783E−09  | −4.535831E−08 | −1.648948E−11 | −9.809415E−12 |
| A12 | −5.286902E−10 | 3.226820E−08  | −2.252553E−12 | −1.345916E−12 |
| A13 | 1.629015E−10  | −8.579679E−09 | −2.810232E−13 | −1.921741E−13 |
| A14 | 5.499059E−12  | 3.813155E−10  | −3.448790E−14 | −2.822358E−14 |
| A15 | −4.548063E−12 | 5.598549E−11  | −4.040643E−15 | −4.106888E−15 |
| A16 | 3.403725E−13  | 1.663888E−11  | −4.693225E−16 | −5.347499E−16 |
| A17 | −2.720442E−14 | −5.405804E−12 | −3.801573E−17 | −5.301189E−17 |
| A18 | 6.994286E−15  | 3.989246E−13  | 8.841662E−19  | −7.700044E−19 |
| A19 | −7.068432E−16 | 2.324549E−15  | 1.619187E−18  | 1.429198E−18 |
| A20 | 2.277958E−17  | −8.872454E−16 | 5.983787E−19  | 5.654279E−19 |

| | si | | |
|---|---|---|---|
| | 6 | 7 | 13 |
| KA  | 1.202287E+00  | 4.190149E−01  | 7.606209E−01 |
| A3  | −6.129879E−04 | −5.760822E−04 | −3.442511E−05 |
| A4  | 1.241627E−03  | 1.049838E−03  | −1.053326E−04 |
| A5  | −1.513778E−03 | −7.886890E−04 | −5.058737E−05 |
| A6  | 9.297550E−04  | 3.414597E−04  | 7.024479E−05 |
| A7  | −2.559823E−04 | −2.848604E−05 | −3.135865E−05 |
| A8  | −1.526669E−05 | −3.654138E−05 | 6.692929E−06 |
| A9  | 2.727538E−05  | 1.379835E−05  | −8.448509E−07 |
| A10 | −4.451471E−06 | −4.393941E−07 | 1.158270E−07 |
| A11 | −6.790790E−07 | −7.150542E−07 | −1.315750E−08 |
| A12 | 1.949304E−07  | 1.512417E−07  | −3.255350E−09 |
| A13 | 2.205997E−08  | −1.751557E−09 | 1.850601E−09 |
| A14 | −6.760158E−09 | −5.085664E−09 | −3.321835E−10 |
| A15 | −7.614439E−10 | 1.328162E−09  | 3.374295E−12 |
| A16 | 2.095374E−10  | −1.578782E−10 | 6.638890E−12 |
| A17 | 2.583971E−11  | 1.091443E−11  | −4.043702E−13 |
| A18 | −9.982452E−12 | −2.546210E−12 | −1.018862E−13 |
| A19 | 9.472750E−13  | 4.989159E−13  | 1.411461E−14 |
| A20 | −3.057244E−14 | −3.049888E−14 | −4.908392E−16 |

TABLE 15

Example 5 Specs and Variable Surface Distance

| | WIDE | MIDDLE | TELE |
|---|---|---|---|
| Zoom Magnification | 1.0 | 1.9 | 3.7 |
| f | 6.61 | 12.24 | 24.45 |
| FNo. | 1.87 | 3.85 | 5.10 |
| 2ω[°] | 90.06 | 49.28 | 24.90 |
| DD[4] | 18.42 | 8.83 | 2.31 |
| DD[12] | 6.46 | 16.64 | 34.73 |
| DD[14] | 5.71 | 4.33 | 4.39 |

Example 6

Figure 6:
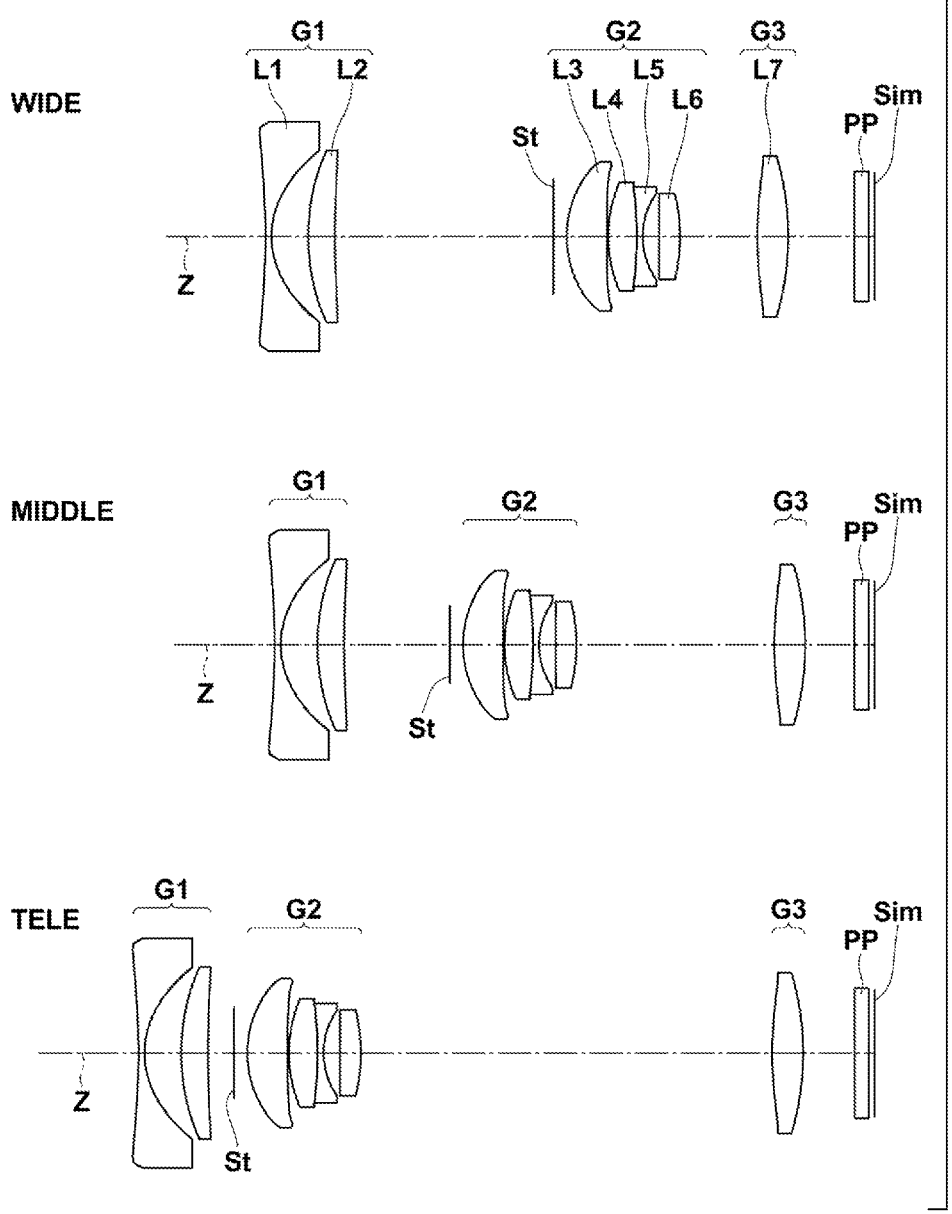
FIG. 6 is a cross-sectional view of a zoom lens of Example 6 of the present invention, illustrating the lens configuration thereof.

A cross-sectional view illustrating the configuration of a zoom lens of Example 6 is as shown in FIG. 6. The schematic configuration of the zoom lens of Example 5 is roughly identical to that of the zoom lens of Example 4 described above. Tables 16, 17 and 18 show the basic lens data, aspherical surface coefficients, and specs and variable surface distance data of the zoom lens of Example 6 respectively. A to L of FIG. 12 are the respective aberration diagrams of the zoom lens of Example 6.

TABLE 16

Example 6 Basic Lens Data

| si | ri | di | ndj | vdj |
|---|---|---|---|---|
| *1 | −47.1476 | 0.50 | 1.851348 | 40.10 |
| *2 | 7.7517 | 3.10 | | |
| *3 | 18.3558 | 2.25 | 2.001784 | 19.32 |
| *4 | 70.4082 | DD[4] | | |
| 5 (St) | ∞ | 1.10 | | |
| *6 | 9.4284 | 3.40 | 1.743198 | 49.29 |
| *7 | 4126.6928 | 0.10 | | |
| 8 | 12.3379 | 2.41 | 1.592824 | 68.63 |
| 9 | −36.1448 | 0.50 | 1.728250 | 28.46 |
| 10 | 6.7486 | 1.40 | | |
| 11 | 2030.0411 | 1.75 | 1.496999 | 81.54 |
| 12 | −15.9804 | DD[12] | | |
| *13 | 33.7342 | 2.60 | 1.568672 | 58.50 |
| 14 | −25.5766 | DD[14] | | |
| 15 | ∞ | 1.17 | 1.516798 | 64.20 |
| 16 | ∞ | 0.50 | | |

TABLE 17

Example 6 Aspherical Surface Coefficient

| | si | | | |
|---|---|---|---|---|
| | 1 | 2 | 3 | 4 |
| KA | 1.924134E+00 | 2.471154E-01 | 9.974985E-01 | 1.976559E+00 |
| A3 | 1.610545E-03 | 1.528807E-03 | -2.982543E-04 | -2.361609E-04 |
| A4 | -7.343415E-04 | -7.126324E-04 | -5.904399E-05 | -5.749258E-05 |
| A5 | 4.059124E-04 | 6.339770E-06 | 1.580940E-06 | -2.071469E-07 |
| A6 | -1.412200E-04 | 2.841550E-04 | 8.657411E-07 | 6.256621E-07 |
| A7 | 2.623768E-05 | -2.061994E-04 | 1.120217E-07 | 6.328048E-08 |
| A8 | -3.673165E-06 | 7.045707E-05 | 9.544136E-09 | 3.082962E-09 |
| A9 | 7.842583E-07 | -1.275312E-05 | 4.596981E-10 | 3.242050E-12 |
| A10 | -1.248405E-07 | 1.045405E-06 | -2.383329E-11 | -1.632999E-11 |
| A11 | 6.882110E-09 | -4.533050E-08 | -1.053977E-11 | -2.519759E-12 |
| A12 | -5.566133E-10 | 3.227122E-08 | -1.859614E-12 | -4.254847E-13 |
| A13 | 1.714667E-10 | -8.579495E-09 | -2.588339E-13 | -9.681394E-14 |
| A14 | 5.787935E-12 | 3.812982E-10 | -3.140026E-14 | -2.154066E-14 |
| A15 | -4.787464E-12 | 5.597750E-11 | -3.319609E-15 | -4.164860E-15 |
| A16 | 3.582876E-13 | 1.663717E-11 | -3.148581E-16 | -6.825239E-16 |
| A17 | -2.863597E-14 | -5.406059E-12 | -1.821854E-17 | -8.854373E-17 |
| A18 | 7.362456E-15 | 3.989973E-13 | 9.514304E-19 | -6.698613E-18 |
| A19 | -7.440398E-16 | 2.324422E-15 | 7.146419E-19 | 7.108410E-19 |
| A20 | 2.397897E-17 | -8.864129E-16 | 2.248301E-19 | 4.973605E-19 |

| | si | | |
|---|---|---|---|
| | 6 | 7 | 13 |
| KA | 1.174877E+00 | -9.855266E-25 | 1.309447E+00 |
| A3 | -6.064703E-04 | -5.781919E-04 | -1.180464E-04 |
| A4 | 1.234909E-03 | 1.039169E-03 | -6.178139E-05 |
| A5 | -1.513031E-03 | -7.860474E-04 | -6.032014E-05 |
| A6 | 9.302951E-04 | 3.421635E-04 | 7.043724E-05 |
| A7 | -2.559466E-04 | -2.847495E-05 | -3.119859E-05 |
| A8 | -1.527575E-05 | -3.656040E-05 | 6.705821E-06 |
| A9 | 2.727276E-05 | 1.379423E-05 | -8.456154E-07 |
| A10 | -4.451779E-06 | -4.397152E-07 | 1.154652E-07 |
| A11 | -6.790781E-07 | -7.150067E-07 | -1.321571E-08 |
| A12 | 1.949397E-07 | 1.512619E-07 | -3.260339E-09 |
| A13 | 2.206226E-08 | -1.747963E-09 | 1.850810E-09 |
| A14 | -6.759818E-09 | -5.085293E-09 | -3.320542E-10 |
| A15 | -7.614188E-10 | 1.328168E-09 | 3.394329E-12 |
| A16 | 2.095342E-10 | -1.578839E-10 | 6.641412E-12 |
| A17 | 2.583810E-11 | 1.091304E-11 | -4.042315E-13 |
| A18 | -9.982752E-12 | -2.546410E-12 | -1.019033E-13 |
| A19 | 9.472540E-13 | 4.988943E-13 | 1.410814E-14 |
| A20 | -3.056177E-14 | -3.049593E-14 | -4.914631E-16 |

TABLE 18

Example 6 Specs and Variable Surface Distance

| | WIDE | MIDDLE | TELE |
|---|---|---|---|
| Zoom Magnification | 1.0 | 1.9 | 3.7 |
| f | 6.61 | 12.24 | 24.45 |
| FNo. | 1.87 | 3.85 | 5.10 |
| 2ω[°] | 90.06 | 49.32 | 24.90 |
| DD[4] | 18.42 | 8.91 | 2.22 |
| DD[12] | 6.51 | 16.67 | 34.66 |
| DD[14] | 5.59 | 4.16 | 4.35 |

Table 19 shows values corresponding to the conditional expressions (1) to (6) of Examples 1 to 6. The values shown in FIG. 19 are those with respect to the d-line.

TABLE 19

| | Conditional Expression 1 (r1 + r2)/(r1 - r2) | Conditional Expression 2 d1/DG1 | Conditional Expression 3 nd2 | Conditional Expression 4 nd1 | Conditional Expression 5 vd1 | Conditional Expression 6 f1/fw |
|---|---|---|---|---|---|---|
| Example 1 | 0.808 | 0.080 | 1.99754 | 1.81817 | 42.56 | -2.06 |
| Example 2 | 0.734 | 0.083 | 1.94595 | 1.85135 | 40.10 | -2.05 |
| Example 3 | 0.706 | 0.083 | 1.94595 | 1.85135 | 40.10 | -2.07 |
| Example 4 | 0.718 | 0.086 | 2.00178 | 1.85135 | 40.10 | -2.07 |
| Example 5 | 0.707 | 0.087 | 1.99900 | 1.82080 | 42.71 | -2.10 |
| Example 6 | 0.718 | 0.085 | 2.00178 | 1.85135 | 40.10 | -2.08 |

The foregoing data indicate that the zoom lenses of Examples 1 to 6 have a zoom ratio of 3.7, and total angles of view and F-numbers at the wide angle end in the range of about 88° to 90° and 1.85 to 1.98 respectively, showing that they have favorable optical performance and formed compact.

Next, an embodiment of the imaging apparatus of the present invention will be described. FIGS. 13A and 13B respectively are a front perspective view and a rear perspective view of a digital camera 10, which is one embodiment of the imaging apparatus of the present invention.

As shown in FIG. 13A, the digital camera 10 includes a zoom lens 12 according to an embodiment of the present invention, a finder object window 13a, and a flash emission device 14 for emitting flash light onto a subject on the front of a camera body 11. Further, a shutter button 15 is provided on the top face of the camera body 11 and an image sensor 16 that captures a subject image formed by the zoom lens 12 is provided inside the camera body 11. The image sensor 16 shown in FIG. 13A is depicted conceptually and does not necessarily represent the size or shape.

Further, as illustrated in FIG. 13B, a LCD (Liquid Crystal Display) 17 for displaying images and various setting screens, a finder observation window 13b, a zoom lever 18 for zooming the zoom lens 12 and an operation button 19 for performing various settings are provided on the rear surface of the camera body 11. Note that the digital camera 10 is configured such that object light guided via the finder object window 13a on the front side is visually recognizable at the finder observation window 13b on the rear side.

So far, the present invention has been described by way of the embodiments and Examples, but the present invention is not limited to the foregoing embodiments and Examples, and various modifications may be made. For example, values of the radius of curvature of each lens, surface distance, refractive index, Abbe number, aspherical surface coefficient, and the like are not limited to those illustrated in each numerical example and may take other values.

In the foregoing embodiment, the description has been made of a case in which a digital camera is taken as an example of the imaging apparatus, but the present invention is not limited to this and is also applicable to other imaging apparatuses such as, for example, video cameras, broadcasting cameras, surveillance cameras, and the like.

What is claimed is:

1. A zoom lens, consisting essentially of:
a first lens group having a negative refractive power;
a second lens group having a positive refractive power; and
a third lens group having a positive refractive power, in order from the object side,
wherein, upon zooming from the wide angle end to the telephoto end, the first lens group, the second lens group, and the third lens group are moved along the optical axis such that the distance between the first lens group and the second lens group is reduced, and the distance between the second lens group and the third lens group is increased,
wherein the first lens group consists essentially of a negative lens and a positive lens in order from the object side,
wherein the second lens group consists essentially of a positive lens, a positive lens having a biconvex shape, a negative lens, and a positive lens in order from the object side, and
wherein the zoom lens satisfies conditional expressions (1) to (5') given below:

$$0.50 < (r1+r2)/(r1-r2) < 1.00 \tag{1}$$

$$0.06 < d1/DG1 < 0.11 \tag{2}$$

$$1.94 < nd2 \tag{3}$$

$$1.80 < nd1 \tag{4}$$

$$42.0 < vd1 \tag{5'}$$

where
r1: radius of curvature of the object side surface of the negative lens in the first lens group,
r2: radius of curvature of the image side surface of the negative lens in the first lens group,
d1: center thickness of the negative lens in the first lens group,
DG1: distance from the most object side surface in the first lens group to the most image side surface in the first lens group on the optical axis,
nd2: refractive index of the positive lens in the first lens group with respect to the d-line,
nd1: refractive index of the negative lens in the first lens group with respect to the d-line, and
vd1: Abbe number of the negative lens in the first lens group with respect to the d-line.

2. The zoom lens as claimed in claim 1, wherein the zoom lens satisfies a conditional expression (1') given below:

$$0.60 < (r1+r2)/(r1-r2) < 0.90 \tag{1'}$$

3. The zoom lens as claimed in claim 1, wherein the zoom lens satisfies a conditional expression (2') given below:

$$0.07 < d1/DG1 < 0.10 \tag{2'}$$

4. The zoom lens as claimed in claim 1, wherein the zoom lens satisfies a conditional expression (3') given below:

$$1.98 < nd2 \tag{3'}$$

5. The zoom lens as claimed in claim 1, wherein the zoom lens satisfies a conditional expression (4') given below:

$$1.81 < nd1 \tag{4'}$$

6. The zoom lens as claimed in claim 1, wherein the zoom lens satisfies a conditional expression (6) given below:

$$-2.40 < f1/fw < -1.70 \tag{6}$$

where
f1: focal length of the first lens group, and
fw: focal length of the entire system at the wide angle end.

7. The zoom lens as claimed in claim 6, wherein the zoom lens satisfies a conditional expression (6') given below:

$$-2.20 < f1/fw < -1.90 \tag{6'}$$

8. The zoom lens as claimed in claim 1, wherein at least one surface of the positive lens in the first lens group is aspherical.

9. The zoom lens as claimed in claim 1, wherein at least one surface of the negative lens in the first lens group is aspherical.

10. The zoom lens as claimed in claim 1, wherein the zoom lens is configured to perform focusing by moving only the third lens group in an optical axis direction.

11. An imaging apparatus equipped with the zoom lens as claimed in claim 1.

* * * * *